US006154335A

United States Patent [19]

Smith et al.

[11] Patent Number: 6,154,335

[45] Date of Patent: Nov. 28, 2000

[54] METHOD AND APPARATUS FOR POSITIONING A DUAL ELEMENT MAGNETORESISTIVE HEAD

[75] Inventors: Gordon J. Smith; Hal Hjalmar Ottesen, both of Rochester, Minn.

[73] Assignee: International Business Machines Corporation, Armonk, N.Y.

[21] Appl. No.: 09/095,258

[22] Filed: Jun. 10, 1998

Related U.S. Application Data

[62] Division of application No. 08/582,555, Jan. 2, 1996.

[51] Int. Cl.[7] .................... G11B 21/02

[52] U.S. Cl. .................... 360/75; 360/77.01; 360/77.03

[58] Field of Search .................... 360/75, 113, 77.01, 360/77.03; 369/44.26

[56] References Cited

U.S. PATENT DOCUMENTS

| | | |
|---|---|---|
| 3,416,373 | 12/1968 | Havens . |
| 3,918,091 | 11/1975 | Walraven et al. . |

(List continued on next page.)

FOREIGN PATENT DOCUMENTS

| | | |
|---|---|---|
| 0 242 597 | 10/1987 | European Pat. Off. . |
| 0 423 662 A2 | 4/1991 | European Pat. Off. . |
| 0 645 758 A1 | 3/1995 | European Pat. Off. . |
| 61-177622 | 8/1986 | Japan . |
| 63-183605 | 7/1988 | Japan . |
| 63-191316 | 8/1988 | Japan . |
| 1-98180 | 4/1989 | Japan . |
| 4-95218 | 3/1992 | Japan . |
| 4-109421 | 4/1992 | Japan . |
| 4-141822 | 5/1992 | Japan . |
| 4278216 | 10/1992 | Japan . |
| 5-174515 | 7/1993 | Japan . |
| 06290563 | 10/1994 | Japan . |

OTHER PUBLICATIONS

Bellamy, L. et al., "Disk Drive Motor Speed Control", *IBM Technical Disclosure Bulletin*, 23(11):5163 (Apr. 1981).

Dushkes, S. et al., "Head Crash Detector", *IBM Technical Disclosure Bulletin*, 13(12):3585 (May 1971).

Fontana, R. et al., "Disk Asperity Detector", *IBM Technical Disclosure Bulletin*, 26(3A): 1278–1280 (Aug. 1983).

Gorter, F. et al, "Magnetoresistive Reading of Information", *IEEE Transactions on Magnetics*, MAG–10(3):899–902 (Sep. 1974).

Gruss, E. et al., "Servo System for Magnetic Recording Based on Time Comparison", *IBM Technical Disclosure Bulletin*, 23(2):787–789 (Jul. 1980).

Kerwin, G. et al., "Fast Offset Recovery for Thermal Asperity Data Recovery Procedure", *IBM Technical Disclosure Bulletin*, 34(11):217–219 (Apr. 1992).

Klaassen, K., "Magnetic Recording Channel Front–Ends", *IBM Research Report*, pp. 1–6, (Nov. 1, 1991).

Li, Y. et al., "The Determination of Flash Temperature in Intermittent Magnetic Head/Disk Contacts Using Magnetoresistive Heads", *Journal of Tribology*, 115(1):179–184 (Jan. 1993).

(List continued on next page.)

*Primary Examiner*—Aristotelis M. Psitos
*Assistant Examiner*—Joseph M Vann
*Attorney, Agent, or Firm*—Mark Hollingsworth; Tyler L. Nasiedlak; Matthew J. Bussan

[57] ABSTRACT

The present invention is a method and apparatus for positioning a dual element magnetoresistive (MR) head relative to a storage medium in a storage device. The MR head has first and second MR elements. The storage medium is mounted in the storage device to allow relative movement between the MR head and the storage medium. The storage medium includes servo information provided to induce first and second thermal responses in the MR elements. A controller is coupled to the MR head and controls the relative movement between the MR head and the storage medium using the first and second thermal responses in the MR elements.

9 Claims, 28 Drawing Sheets

U.S. PATENT DOCUMENTS

| | | | |
|---|---|---|---|
| 4,430,010 | 2/1984 | Zrenner et al. . | |
| 4,485,337 | 11/1984 | Sandusky . | |
| 4,498,146 | 2/1985 | Martinez . | |
| 4,532,802 | 8/1985 | Yeack-Scranton et al. . | |
| 4,639,906 | 1/1987 | Goto . | |
| 4,647,992 | 3/1987 | Vinal . | |
| 4,669,011 | 5/1987 | Lemke . | |
| 4,691,259 | 9/1987 | Imakoshi et al. . | |
| 4,712,144 | 12/1987 | Klaassen . | |
| 4,747,698 | 5/1988 | Wickramsinghe et al. . | |
| 4,762,427 | 8/1988 | Hori et al. . | |
| 4,777,544 | 10/1988 | Brown et al. . | |
| 4,802,033 | 1/1989 | Chi . | |
| 4,853,810 | 8/1989 | Pohl et al. . | |
| 4,914,398 | 4/1990 | Jove et al. . | |
| 4,931,887 | 6/1990 | Hegde et al. . | |
| 4,949,036 | 8/1990 | Bezinque et al. . | |
| 4,959,599 | 9/1990 | Nakadai et al. . | |
| 5,032,935 | 7/1991 | Jove et al. . | |
| 5,054,936 | 10/1991 | Fraden . | |
| 5,057,785 | 10/1991 | Chung et al. . | |
| 5,070,495 | 12/1991 | Bletscher, Jr. et al. . | |
| 5,079,663 | 1/1992 | Ju et al. . | |
| 5,084,791 | 1/1992 | Thanos et al. . | |
| 5,130,866 | 7/1992 | Klaassen et al. . | |
| 5,168,413 | 12/1992 | Coker et al. . | |
| 5,185,681 | 2/1993 | Volz et al. . | |
| 5,212,677 | 5/1993 | Shimote et al. . | |
| 5,220,476 | 6/1993 | Godwin et al. . | |
| 5,233,482 | 8/1993 | Galbraith et al. . | |
| 5,255,136 | 10/1993 | Machado et al. . | |
| 5,301,080 | 4/1994 | Ottesen et al. . | |
| 5,321,559 | 6/1994 | Nguyen et al. . | |
| 5,325,244 | 6/1994 | Takano et al. . | |
| 5,327,298 | 7/1994 | Ottesen et al. . | |
| 5,345,342 | 9/1994 | Abbott et al. . | |
| 5,367,409 | 11/1994 | Ottesen et al. . | |
| 5,377,058 | 12/1994 | Good et al. . | |
| 5,384,514 | 1/1995 | Smith et al. | 360/75 |
| 5,388,014 | 2/1995 | Brug et al. . | |
| 5,402,278 | 3/1995 | Morita . | |
| 5,418,770 | 5/1995 | Ide et al. . | |
| 5,424,885 | 6/1995 | McKenzie et al. . | |
| 5,430,706 | 7/1995 | Utsunomiya et al. . | |
| 5,455,730 | 10/1995 | Dovek et al. . | |
| 5,527,110 | 6/1996 | Abraham et al. . | |
| 5,739,972 | 4/1998 | Smith et al. | 360/77.03 |
| 5,806,978 | 9/1998 | Abraham et al. | 374/1 |
| 5,810,477 | 9/1998 | Abraham et al. | 374/7 |
| 5,850,374 | 12/1998 | Abraham et al. | 369/14 |

OTHER PUBLICATIONS

Lin, C., "Techniques for the Measurement of Air–Bearing Separation–A Review", *IEEE Transactions on Magnetics*, MAG–9(4):673–677 (Dec. 1973).

Morita, O. et al., "Magnetization Characteristics of Pre–Embossed Patterns on the Molded Plastic Rigid Disk".

Research Disclosure, "Asperity Knee Detection Using Harmonic Ratio Flyheight", Emsworth Design, Inc. 323:190 (Mar. 1991).

Talke, F. et al., "Surface Defect Studies of Flexible Media Using Magnetoresistive Sensors, ", *IEEE Transactions on Magnetics*, MAG–11(5):1188–1190 Sep. 1975).

Tanaka, S. et al. "Characterization of Magnetizing Process for Pre–Embossed Servo Pattern of Plastic Hard Disks", *IEEE Transactions on Magnetics* , 30(6):4209–4211 (Nov. 1994).

Watanabe, K. et al., "Demonstration of Track Following Technic Based on Discrete Track Media", pp. 1–3.

Watanabe, K. et al., "Demonstration of Track Following Technique Based on Discrete Track Media", *IEEE Transactions on Magnetics*, 29(6):4030–4032 (Nov. 1993).

Yada, H. et al, "High Areal Density Recording Using an MR/Inductive Head and Pre–Embossed Rigid Magnetic Disk", *IEEE Transactions on Magnetics*, 30(2):404–409 (Mar. 1994).

METHOD AND APPARATUS FOR POSITIONING A DUAL ELEMENT MAGNETORESISTIVE HEAD

This application is a Divisional of application Ser. No. 08/582,555, filed Jan. 2, 1996, which application is incorporated herein by reference.

FIELD OF THE INVENTION

The present invention relates generally to data storage systems, and, more particularly, to a method and apparatus for positioning a dual element magnetoresistive (MR) head relative to a storage medium.

BACKGROUND OF THE INVENTION

A typical data storage system includes a magnetic medium for storing data in magnetic form and a transducer used to read and/or write magnetic data from/to the storage medium. A disk storage device, for example, includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator assembly and passed over the surface of the rapidly rotating disks.

The actuator assembly typically includes a coil assembly and a plurality of outwardly extending arms having flexible suspensions with one or more transducers and slider bodies being mounted on the suspensions. The suspensions are interleaved within the stack of rotating disks, typically by means of an arm assembly (E/block) mounted to the actuator assembly. The coil assembly generally interacts with a permanent magnet structure, and is responsive to a controller. A voice coil motor (VCM) is also mounted to the actuator assembly diametrically opposite the actuator arms.

In a typical digital data storage system, digital data is stored in the form of magnetic transitions on a series of concentric, spaced tracks comprising the surface of the magnetizable rigid data storage disks. The tracks are generally divided into a plurality of sectors, with each sector comprising a number of information fields. One of the information fields is typically designated for storing data, while other fields contain track and sector position identifications and synchronization information, for example. Data is transferred to, and retrieved from, specified track and sector locations by the transducers which follow a given track and move from track to track, typically under the servo control of a controller.

The head slider body is typically designed as an aerodynamic lifting body that lifts the MR head off the surface of the disk as the rate of spindle motor rotation increases, and causes the MR head to hover above the disk on an air-bearing cushion produced by high speed disk rotation. The separation distance between the MR head and the disk, typically 0.1 microns or less, is commonly referred to as head-to-disk spacing.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals in the read element. The electrical signals correspond to transitions in the magnetic field.

Conventional data storage systems generally employ a closed-loop servo control system for positioning the actuator and read/write transducers to specified storage locations on the data storage disk. During normal data storage system operation, a servo transducer, generally mounted proximate the read/write transducers, or, alternatively, incorporated as the read element of the transducer, is typically employed to read information for the purpose of following a specified track (track following) and seeking specified track and data sector locations on the disk (track seeking).

A servo writing procedure is typically implemented to initially record servo pattern information on the surface of one or more of the data storage disks. A servo writer assembly is typically used by manufacturers of data storage systems to facilitate the transfer of servo pattern data to one or more data storage disks during the manufacturing process.

In accordance with one known servo technique, embedded servo pattern information is written to the disk along segments extending in a direction generally outward from the center of the disk. The embedded servo pattern is thus formed between the data storing sectors of each track. It is noted that a servo sector typically contains a pattern of data, often termed a servo burst pattern, used to maintain optimum alignment of the read/write transducers over the centerline of a track when reading and writing data to specified data sectors on the track. The servo information may also include sector and track identification codes which are used to identify the position of the transducer. Embedded servo offers significantly higher track densities than dedicated servo since servo information is co-located with the targeted data information (and servo information may be taken from one, single disk surface).

In a further effort to increase disk capacity, a proposed servo information format was developed, termed pre-embossed rigid magnetic (PERM) disk technology. As described and illustrated in Tanaka et al., Characterization of Magnetizing Process for Pre-Embossed Servo Pattern of Plastic Hard Disks, I.E.E.E. Transactions on Magnetics 4209 (Vol. 30, No. 2, November 1994), a PERM disk contains servo information in a number of servo zones spaced radially about the disk. Each servo zone contains pre-embossed recesses and raised portions to form a fine pattern, clock mark, and address code. The fine pattern and address code are used to generate servo information signals. To generate the servo signals, the magnetization direction of the raised portions and the recesses must be opposite. The magnetization process involves first magnetizing the entire disk in one direction using a high-field magnet. Then, a conventional write head is used to magnetize the raised areas in the opposite direction.

While use of a PERM disk may increase disk capacity, such an approach suffers from a number of shortcomings. Servo information is provided on a PERM servo disk in a two-step magnetization process, as described above. This significantly increases the amount of time required to write servo information to the disk. Moreover, during the second step of the process, servo information is not yet available on the disk. Thus, an external positioning system must be employed, thereby increasing the cost of the servo writing process. Additional concerns associated with PERM disk technology include durability.

Finally, the PERM disk, like other embedded servo techniques, still stores servo information in disk space which could otherwise be used for data storage. As a result, PERM disk technology, although still at the research level, has not been widely accepted by industry.

There exists in the data storage system manufacturing industry a need for a servo information format which is inexpensive to provide and which optimizes the data capacity of a disk. The present invention addresses these and other needs.

SUMMARY OF THE INVENTION

The present invention is a method and apparatus for positioning a dual element magnetoresistive (MR) head relative to a storage medium in a storage device. The MR head has first and second MR elements. The storage medium is mounted in the storage device to allow relative movement between the MR head and the storage medium. The storage medium includes servo information provided to induce first and second thermal responses in the MR elements. A controller is coupled to the MR head and controls the relative movement between the MR head and the storage medium using the first and second thermal responses in the MR elements.

DETAILED DESCRIPTION OF THE EMBODIMENTS

Figure 1:
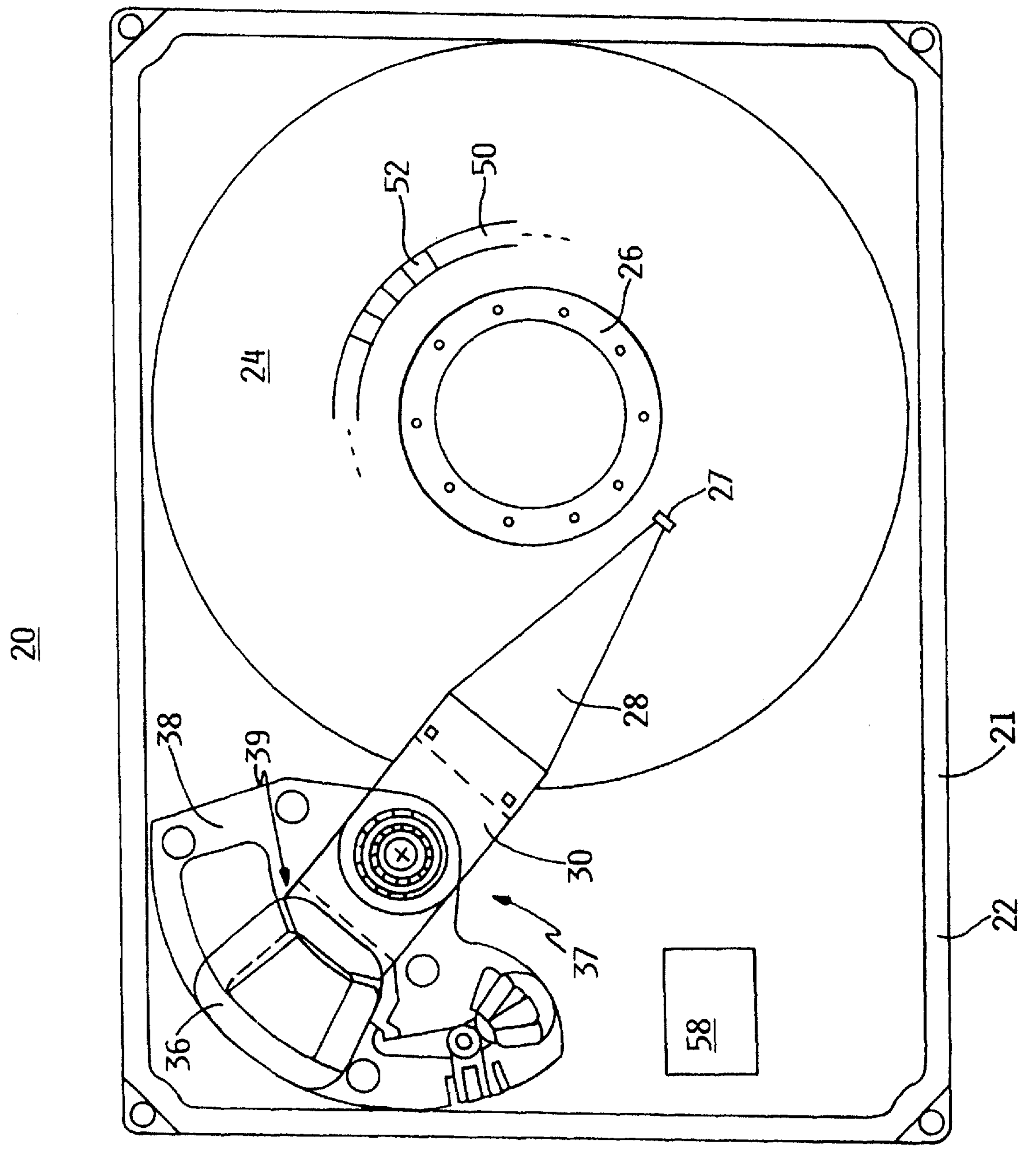
FIG. 1 is a top view of a data storage system with its upper housing cover removed.
Figure 2:
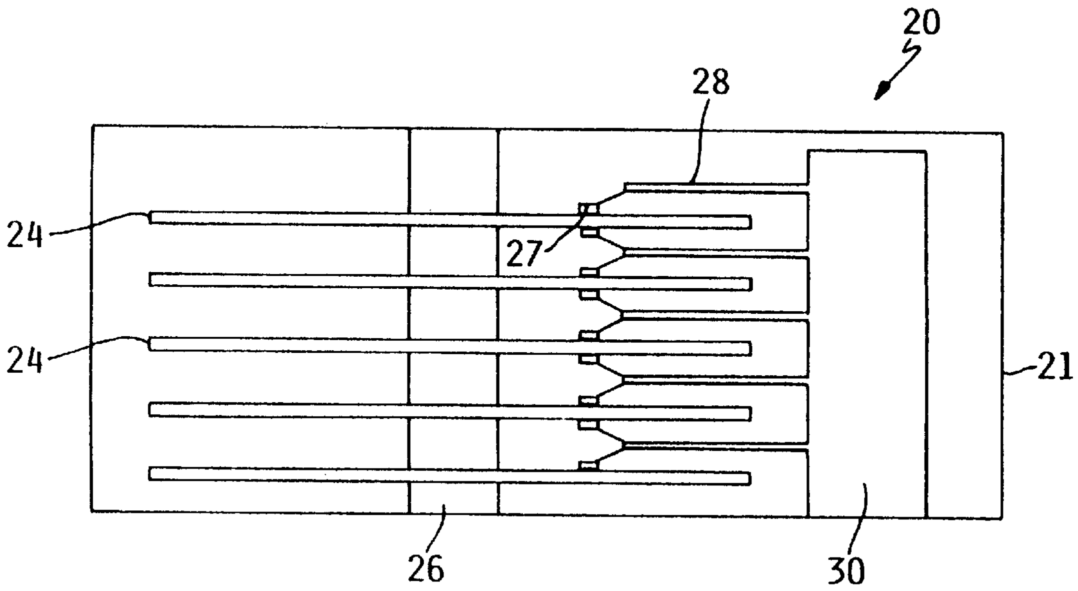
FIG. 2 is a side plan view of a data storage system comprising a plurality of data storage disks.

Referring now to the drawings, and more particularly to FIGS. 1 and 2, there is shown a data storage system 20 with its cover (not shown) removed from the base 22 of the housing 21. The data storage system 20 typically includes one or more rigid data storage disks 24 which rotate about a spindle motor 26. An actuator assembly 37 typically includes a plurality of interleaved actuator arms 30, with each arm supporting one or more suspensions 28 and transducers 27. The transducers 27 typically include a magnetoresistive (MR) element for reading and writing information to and from the data storage disks 24. The transducer 27 may be, for example, an MR head having a write element and an MR read element. The actuator assembly 37 includes a coil assembly 36 which cooperates with a permanent magnet structure 38 to operate as an actuator voice coil motor (VCM) 39 responsive to control signals produced by a controller 58. The controller 58 preferably includes control circuity that coordinates the transfer of data to and from the data storage disks 24, and cooperates with the VCM 39 to move the actuator arms 30, suspensions 28, and transducers 27 to prescribed track 50 and sector 52 locations when reading and writing data to and from the disks 24.

Figure 3:
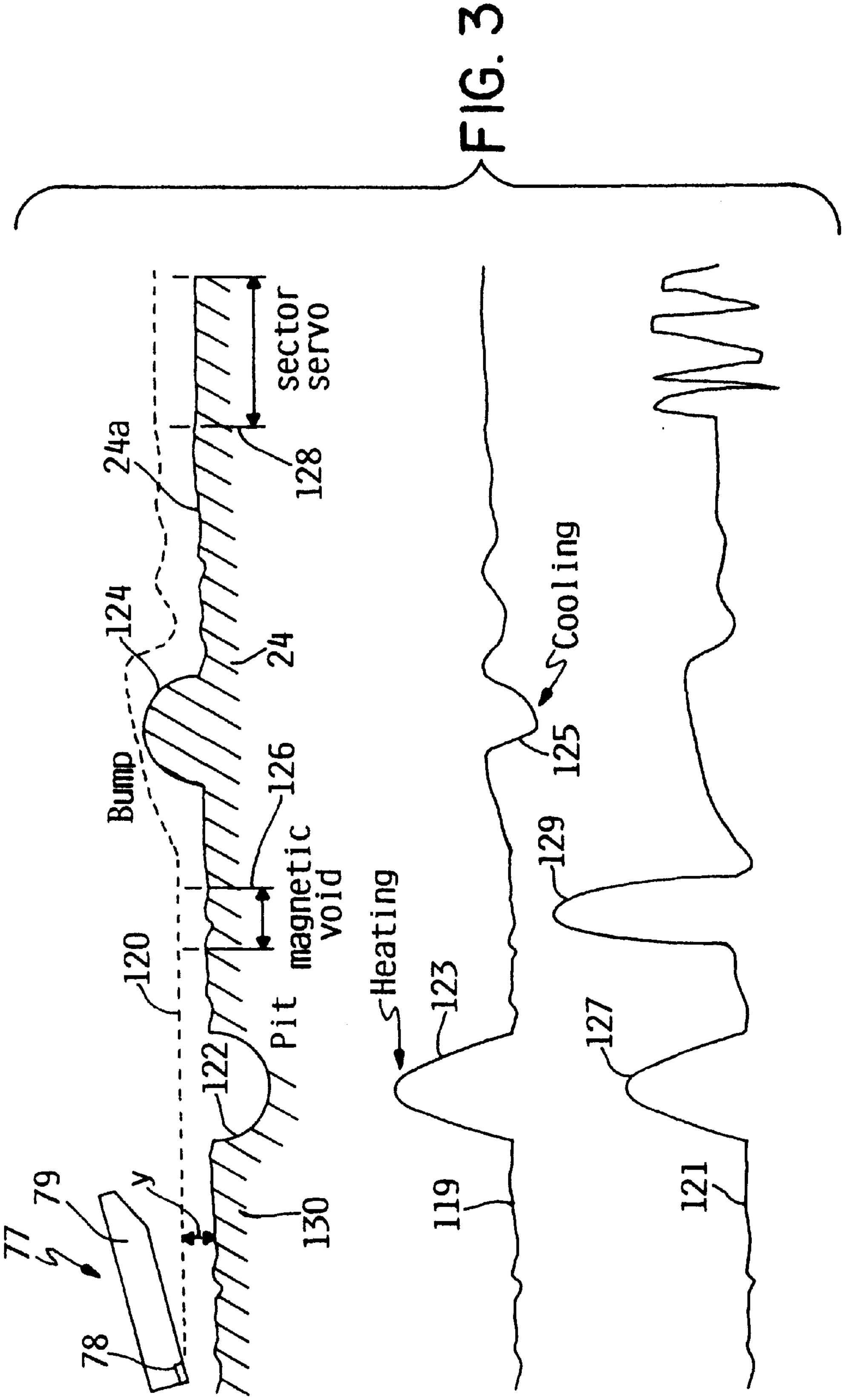
FIG. 3 is an exaggerated side view showing a data storage disk exhibiting various surface defects and features, and a thermal signal and magnetic spacing signal response of an MR head to such defects and features.

In FIG. 3, there is illustrated an exaggerated side view of an MR head slider 79 flying in proximity with the surface 24*a* of a magnetic data storage disk 24. The disk surface 24*a* has a generally varying topography at the microscopic level, and often includes various surface defects, such as a pit 122, a bump 124, or a surface portion 126 void of magnetic material. It has been determined by the inventors that the thermal response of an MR head 77 changes as a function of the spacing, denoted by the parameter y, between the MR element 78 of the MR head 77 and the disk surface 24*a*. Head-to-disk spacing changes result in concomitant changes in heat transfer between the MR element 78 and disk 24. This heat transfer results in an alteration in the temperature of the MR element 78. Temperature changes in the MR element 78 result in corresponding changes in the electrical resistance of the MR element 78 and, therefore, the output voltage of the MR element 78.

As the instantaneous head-to-disk spacing (y) increases, there results a corresponding increase in air space insulation between the MR head 77 and the disk surface 24*a,* thereby causing an increase in the temperature of the MR element 78. This temperature increase in the MR element 78 results in a corresponding increase in the MR element 78 resistance due to the positive temperature coefficient of the MR element material typically used to fabricate the MR element 78. Permalloy, for example, is a preferred material used to fabricate the MR element 78 and demonstrates a temperature coefficient of $+3\times10^{-3}/°$ C. An MR head 77 passing over a bump 124 on the disk surface 24*a,* by way of example, results in increased heat transfer occurring between the MR element 78 and the disk surface 24*a,* thereby causing cooling of the MR element 78. Such cooling of the MR element 78 causes a decrease in the MR element resistance which, in turn, results in a corresponding decrease in the voltage $v_{TH}$ across the MR element 78 at a constant bias current.

It can be seen by referring to the pit 122 depicted on the disk surface 24*a* that the thermal voltage signal $v_{TH}$ 119 across the MR element increases in amplitude as a function of increasing head-to-disk separation distance (y). It can further be seen by referring to the bump 124 depicted on the disk surface 24*a* that the thermal voltage signal $v_{TH}$ 119 decreases in amplitude as a function of decreasing head-to-disk separation distance. The thermal signal component of the readback signal, therefore, is in fact an information signal that can be used to detect the presence and relative magnitude of topographical variations in the surface of a magnetic data storage disk 24.

Also shown in FIG. 3 is a magnetic spacing signal 121 which has been conditioned to correspond to variations in the disk surface 24*a*. It can be seen that the magnetic spacing signal 121 incorrectly indicates the presence of some surface features, such as magnetic voids 126, as variations in the topography of the disk surface 24*a*. It can further be seen that the magnetic spacing signal 121 provides an inferior indication of other surface features, such as bumps, when compared to disk surface imaging information provided by use of the thermal signal 119.

As described more fully below, the thermal component of an MR element readback signal may be extracted to obtain information regarding surface characteristics of the rotating disk 24. In accordance with an exemplary embodiment of the invention, servo information is encoded in a surface profile of the disk 24 and is read using a transducer having an MR element, e.g., an MR head. As will be appreciated from the exemplary embodiments described below, because the servo information is provided in the profile of the disk and can be read concurrently with magnetically stored data, an additional 15%–20% of the disk is made available to store data (i.e., the portion of the disk previously used for embedded magnetic servo information).

Figure 4:
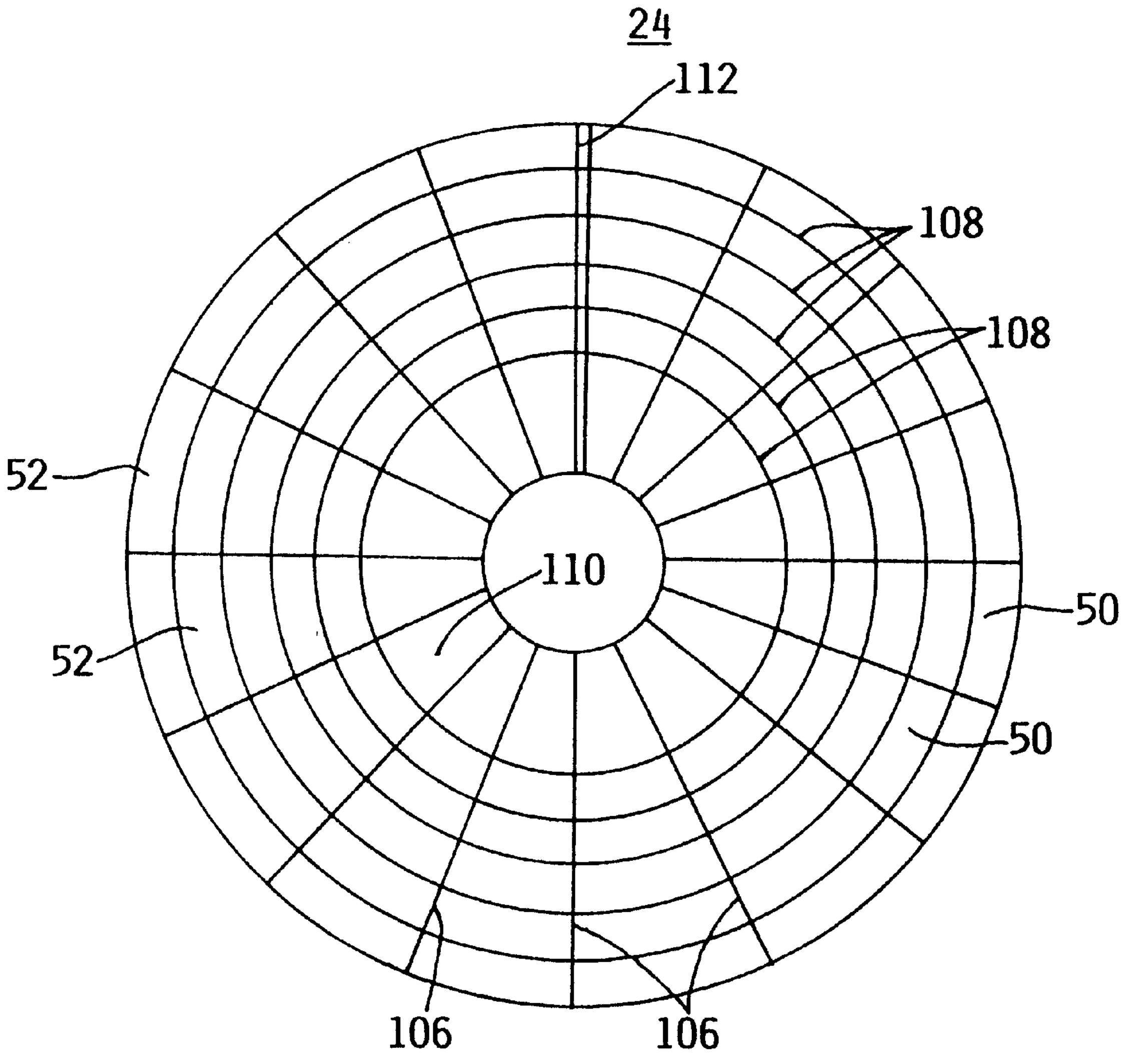
FIG. 4 is a top view of a disk in accordance with the present invention.

FIG. 4 illustrates an exemplary disk 24 having pre-embossed or stamped track markers 108 and sector markers 106 for providing servo information on the disk in the form of variations in head-to-disk spacing. The disk 24 is provided with data tracks 50 used to store data. Each track 50 may be partitioned into a series of sectors 52 identified by sector markers 106. Adjacent tracks 50 are separated by track markers 108. The track markers 108 and the sector markers 106 are formed as variations in the disk which can be identified using the thermal component of the MR head readback signal. As best shown in FIG. 4, the track markers 108 may be circumferential grooves, and the sector markers 106 may be radial grooves. The grooves may be as narrow as one (1) micron and provide head-to-disk spacing variations between adjacent data tracks 50 and sectors 52. As described more fully below, the head-to-disk spacing variations formed by the grooves are used to provide servo information. The disk 24 is also provided with a calibration track 110 and an index marker 112 which may be formed by a closely spaced pair of sector markers 106. The purpose of the calibration track 110 and the index marker 112 will later become apparent.

Figure 5:
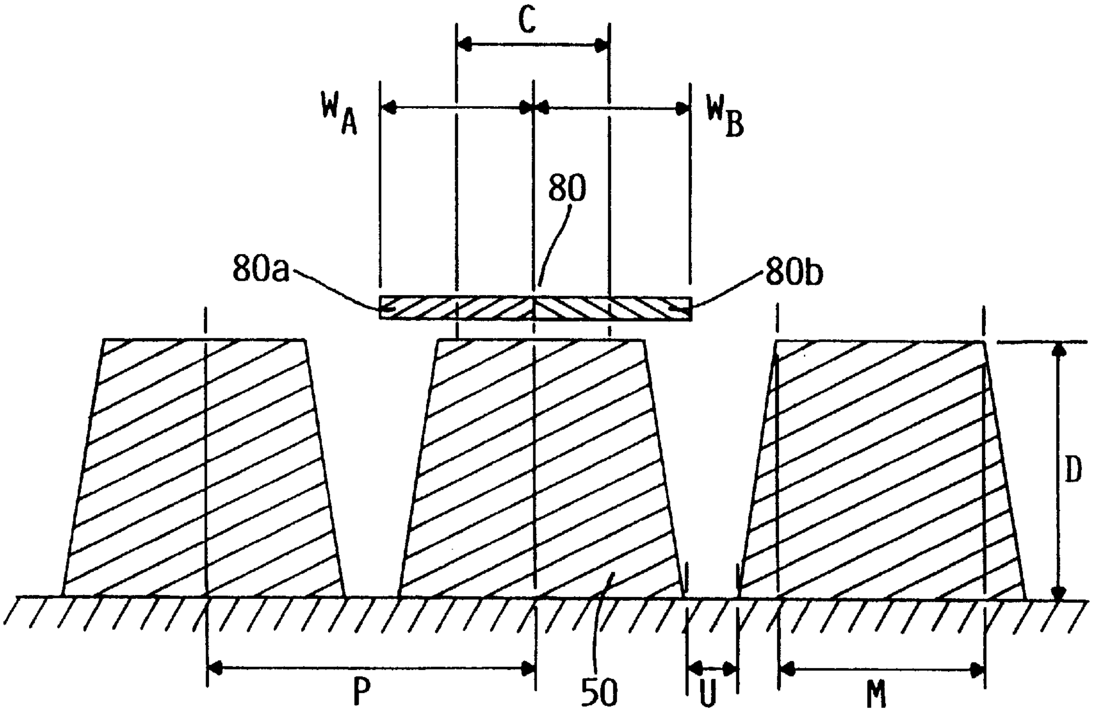
FIG. 5 is an illustration of a read element of a transducer shown in an on-track orientation over the centerline of a track of the disk.

Turning now to FIG. 5, there is shown an illustration of a dual element magnetoresistive (MR) head 80 oriented over the centerline 51 of a track 50. As the MR head 80 passes over the track 50 of the rotating disk 24, magnetic transitions developed on the disk 24 surface result in the production of a readback signal induced in the MR head 80. By way of example, and not of limitation, the readback signal is preferably a voltage signal.

In the illustrative embodiment shown in FIG. 5, the MR head 80 includes two MR elements 80*a* and 80*b* mounted side by side. By using the thermal component of a readback signal obtained from each of the MR elements 80*a* and 80*b,* servo positioning information can be obtained from the profile of disk 24. The thermal signals obtained from each element 80*a* and 80*b* are be used to generate servo control information such as a position error signal (PES signal). Such a PES signal is provided to a controller which uses the PES signal to position the actuator arm 30 and consequently the MR head 80 over a desired track location. A PES signal generated using two side-by-side MR elements 80*a* and 80*b* which are assumed to have equal thermal sensitivity may be expressed by the relationship:

$$PES = \frac{t_a - t_b}{t_a + t_b} \qquad [1]$$

where $t_a$ and $t_b$ represent the integrated peak values of the thermal signals from MR elements 80*a* and 80*b,* respectively.

Figure 6:
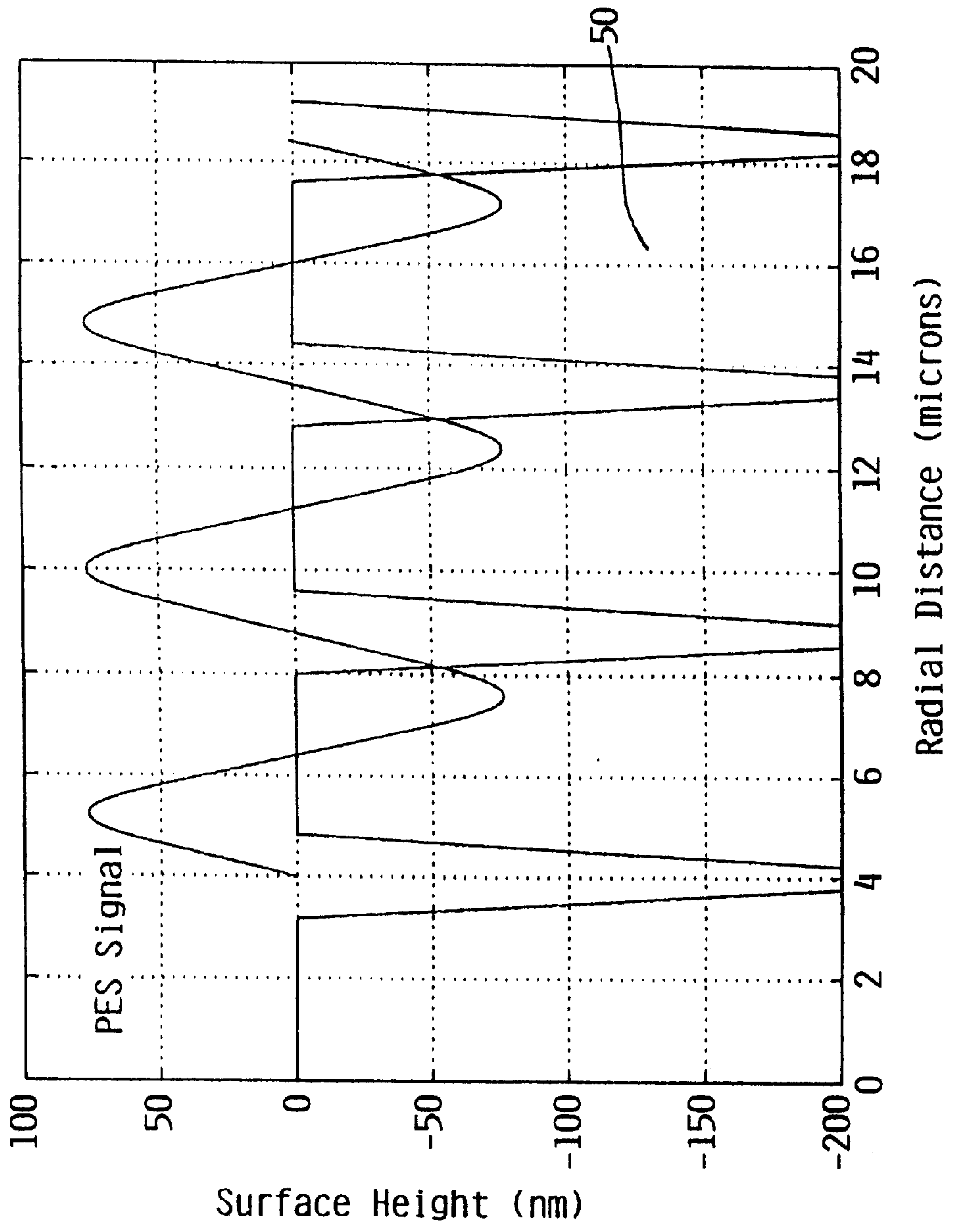
FIG. 6 is an illustration of a thermal position error signal associated with the MR elements of the transducer passing over tracks on the disk.

In FIG. 6, a PES signal produced by dual element MR head 80 crossing over disk 24 is depicted. With reference to FIG. 5, the PES signal of FIG. 6 corresponds to a disk 24 having the following parameters:

| |
|---|
| Track pitch P = 4.8 microns |
| Track width M = 3.2 microns |
| Track height D = 0.2 microns |
| Valley width at bottom U = 0.48 microns |
| MR element A width Wa = 2.4 microns |
| MR element B width Wb = 2.4 microns |
| Element-to-element centerline spacing C = 2.4 microns |

As noted above, the PES signal of FIG. 6 assumes equal thermal sensitivities of the two MR elements 80*a* and 80*b*. In practice, however, the thermal sensitivities of MR elements may differ due to differences in dimensions, recession, shield spacing and dimensions, MR lead thermal conduction, and other characteristics of the two MR elements, for example. The thermal response of the two MR elements 80*a* and 80*b* may be calibrated as discussed more fully hereinbelow.

When calibrated, a dual element MR head 80 generates a PES waveform that exhibits linear behavior between minima and maxima as shown in FIG. 6. With reference to FIGS. 4 and 5, when the two MR elements 80*a* and 80*b* are centered over a track 50, $t_a$ and $t_b$ are equal, thereby producing a PES signal equal to zero. As the MR head 80 moves from the center of the track, the values $t_a$ and $t_b$ change and the PES signal shows an inflection point that corresponds approximately to the edges of the track 50. The inflection points are useful for determining track edges and for counting tracks during seek operations. It should be appreciated that the magnetic component of the readback signal obtained using the MR elements 80*a* and 80*b* can also be used to determine track edges as the head moves over a groove between adjacent tracks since the magnetic signal will contain large dropouts over groove crossings. Such a dropout in the magnetic signal may be used to count tracks during a seek operation.

It should further be appreciated that MR elements 80*a* and 80*b* need not be positioned side by side, provided the PES signal relationship is properly modified to account for the different location of MR elements. It will also be appreciated that more than two MR elements may be used.

Figure 7:
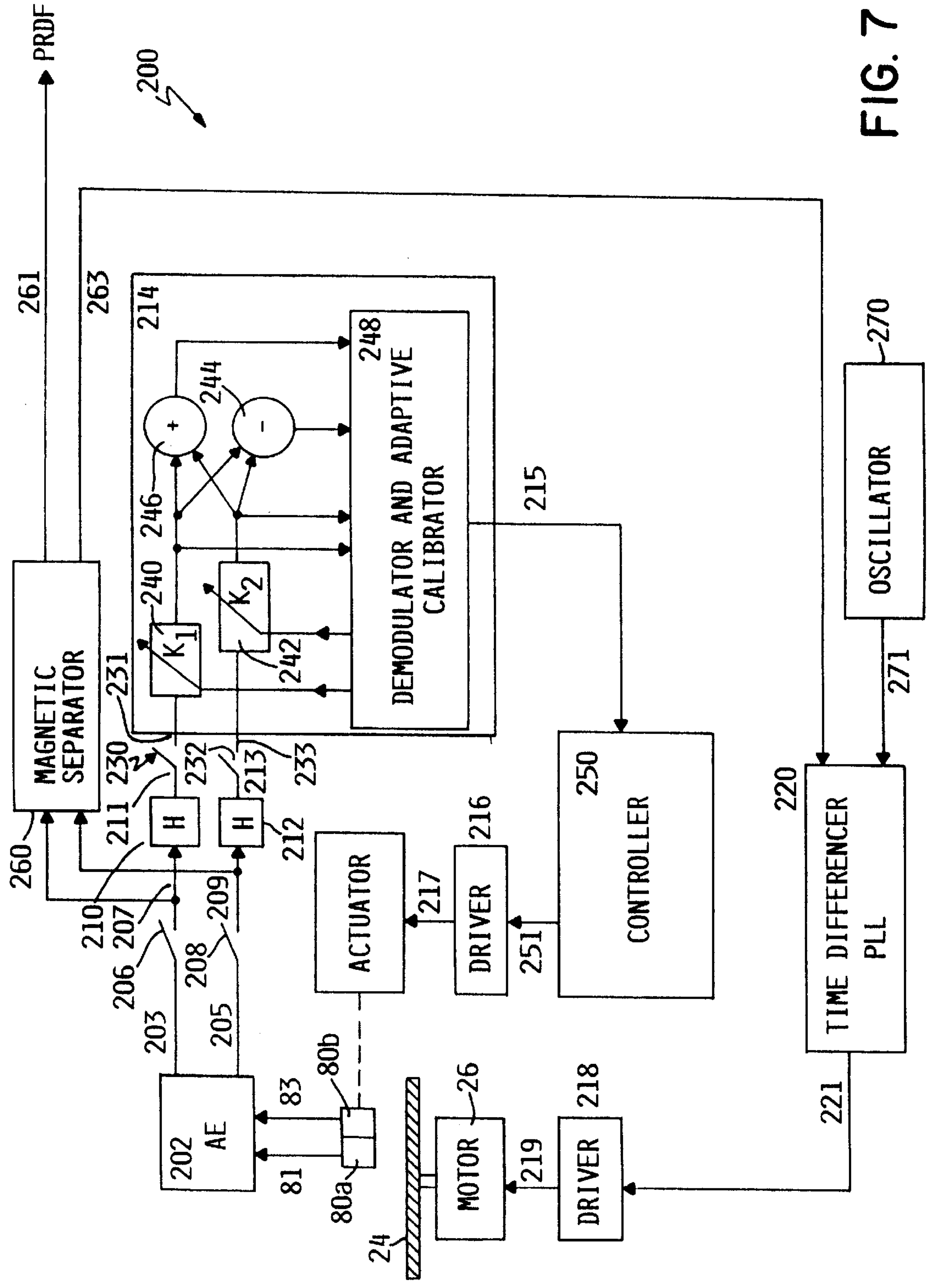
FIG. 7 is a generalized block diagram of the system components for positioning an MR head using the thermal signals of the MR elements in accordance with the present invention.

In FIG. 7, there is shown an illustrative embodiment of servo control system 200 using thermal responses of a dual element MR head 80 to servo position the MR head 80 over a data track 50. The servo control system includes an amplifier 202, two samplers 206, 208, two filters 210, 212, a demodulation and adaptive calibration circuit 214, a controller 250, two drivers 216, 218, a magnetic separator 260, and a time differencer 220.

In operation, the readback signals 81 and 83 from MR elements 80*a* and 80*b* are amplified, for example, by a dual path Arm Electronics (AE) module 202. The amplified readback signals 203 and 205 are sampled by samplers 206, 208 at a sampling rate N to produce first and second readback signals 207 and 209. A typical sampling rate N will be in excess of 100 megahertz (MHz). Readback signals 207 and 209 are low-pass filtered, for example, by finite impulse response (FIR) filters 210, 212 to generate thermal signals 211 and 213. Thermal signals 211 and 213 represent the thermal components $t_a(n)$ and $t_b(n)$ of the readback signals as introduced above.

Thermal signals 211 and 213 are subsampled at a sampling rate M by subsamplers 230 and 232. The sampling rate M is typically much lower than the sampling rate N of samplers 206, 208. The sampling index m, i.e, the ratio of sampling rate N to sampling rate M, may be 500, for example. The use of subsamplers with a slower sampling rate reduces the cost of the system without any loss in accuracy since the thermal signals 211 and 213 can be sampled at a lower rate than magnetic components of readback signals 203, 205 due to the lower mechanical bandwidth requirement for the actuator assembly 37.

Subsampled thermal signals 231 and 233 are provided to the demodulation and adaptive calibration circuit 214 which generates a position error signal (PES) 215 according to the relationship:

$$PES(m) = \frac{t_{231}(m)\cdot k_1 - t_{233}(m)\cdot k_2}{t_{231}(m)\cdot k_1 + t_{233}(m)\cdot k_2} \qquad [2]$$

where $t_{231}$ and $t_{233}$ represent thermal signals 231 and 233 —respectively.

The demodulation and adaptive calibration circuit 214 adjusts the amplitudes of thermal signals 231 and 233 with predetermined calibration coefficients $k_1$ and $k_2$ in multipliers 240 and 242. Calibration coefficients $k_1$ and $k_2$ are provided to adjust for the different thermal sensitivities of the MR elements 80*a* and 80*b*. The numerator of the position error signal PES(m) relationship is produced by a differencer 244 and the denominator of the PES(m) relationship is produced by a summer 246. The position error signal PES(m) may be averaged over L samples for noise smoothing purposes. For example, the position error signal PES(l) may be expressed by the following relationship:

$$PES(l) = (1/L)\sum_{m=i}^{L+i} PES(m) \qquad [3]$$

where a realistic value for L could be 10. Thus, the position error signal may be generated once per M×L samples of the readback signal. For example, if the readback signal was sampled at a rate N of 100 MHz and the sampling index m was 500, then the position error signal PES(l) would be generated at a 20 KHz rate. The position error signal relationship and calibration may be handled by microcode in a demodulator and adaptive calibrator 248.

The PES signal 215 is provided to controller 250 which outputs a control signal 251 in response to the PES signal 215 and the operating mode, for example track seek, settle or follow. The control signal 251 is provided to a driver 206, which converts the control signal 251 to an analog signal and generates a continuous current for the voice coil motor 39 to move the actuator.

Readback signals 207 and 209 are also provided to the data channel and used to drive the spindle motor 26. Readback signals 207 and 209 are provided to a magnetic separator 260 which removes the thermal components of readback signals 207 and 209 and generates a magnetic signal 261 for use by the data channel. The magnetic signal 261 is generated by summing and equalizing the magnetic components of the readback signals 207 and 209. The magnetic separator 260 also generates a magnetic timing signal 263 which is provided for a time difference 220. The magnetic timing signal 263 is generated from the dropouts in the readback signals 207 and 209 which occur as the MR head 80 passes over sector markers 106. The time difference 220, which may include a phase-lock loop, compares the magnetic timing signal 263 to a reference signal 271 provided by an oscillator 270 to generate a differential dynamic timing signal 221. The timing signal 221 is provided for a driver 218 which uses the timing signal to provide current 219 to the spindle motor 26 so as to maintain the appropriate rotational velocity of the disk.

Although the magnetic signal 263 is used for timing and motor control, it should be appreciated that thermal signals could also be used. Magnetic signal dropouts achieve much higher signal-to-noise ratio than thermal signal dropouts and thus allow for narrower sector marker 106 widths. For example, using the magnetic dropout allows sector marker widths of about 1 micron or less. The thermal signals require wider sector markers 106 as the thermal time constant of an MR head 80 is longer.

It should be appreciated that the thermal signals of an MR head 80 can be sampled concurrently with the magnetic signal. Thus, continuous track follow servo control, for example, may be implemented. Unlike traditional magnetic servoing techniques, thermal servoing can reach sampling rates in excess of 100 kilohertz (KHz). The higher sampling rates of thermal servoing provide for smaller actuator coil currents. Moreover, due to the mechanical inertia of the actuator assembly 30, these small currents are integrated to produce very smooth motions, thereby reducing actuator jerk. The finer actuator control allows for higher track densities and significantly improves the detection of shock and vibration in a disk. Moreover, for predictive failure analysis (PFA) purposes, any defect on a disk which might potentially create track misregistration (TMR) can be detected. Similarly, any random MR head 80 modulation, e.g. modulation caused by an MR head 80 that is not lifting off the disk, can be detected.

It should further be appreciated that the PES signal, from which the servo information is obtained, is generated from thermal signals which, in turn, are derived from head-to-disk spacing. In the illustrated embodiment, the servo information is obtained from sensing the changes in the thermal signal that result from the MR head 80 passing over the circumferential grooves. The change in head-to-disk spacing can also be accomplished by elevated portions between tracks 50, though grooves are preferred because they permit operation of the storage system 20 with minimal spacing between the MR head 80 and the data tracks 50. In alternate embodiments of the present invention, servo information can be derived from other variations in disk characteristics which can be reflected in the thermal component of the readback signal. For example, variations in disk-to-MR head heat transfer parameters such as thermal emissivity of a disk 24 may be employed as servo information. Thus, rather than adjacent tracks 50 being separated by topographical changes, track markers 108 could separate tracks 50 by thermal emissivity changes or other parameters reflected in the thermal component of the readback signal. Similar variations in disk characteristics can be used for the sector markers 106.

As noted above, calibration coefficients $k_1$ and $k_2$ are provided for each MR head 80 to adjust for different thermal sensitivities of MR elements 80*a* and 80*b*. A calibration method may be performed which involves measuring the thermal sensitivity of MR elements 80*a* and 80*b* and adjusting the gain values $k_1$ and $k_2$ so that the gain-adjusted thermal responses of each element 80*a* and 80*b* are equal for a common input.

An exemplary calibration procedure for a multiple disk storage device involves the following steps. First, all MR heads 80 of the storage device are moved to the calibration track 110 of their respective disk 24. The calibration track 110 may be provided anywhere on the disk 24, for example, at the inner diameter crash stop of the disk 24, as shown in FIG. 4, or the outer diameter crash stop of the disk 24. The calibration track 110 should be wide enough to accomodate mechanical tolerances, such as disk runout, and wide enough such that when MR head 80 is centered over the calibration track 110, neither MR element 80*a* or 80*b* senses a track marker 108.

Next an MR head 80 is selected and calibration coefficients $k_1$ and $k_2$ are set to one. The disk 24 associated with the selected MR head 80 is spun. As disk 24 spins about its axis, MR elements 80*a* and 80*b* sense a common input, i.e. periodic sector markers 106. A thermally detectable width for sector markers 106 in the calibration track 110 is 50–100 microns. It is noted that the sector marker 106 width in the data tracks 50 need not be as wide as their widths in the calibration track if the sector markers 106 in the data tracks 50 are magnetically detected for tracking counting purposes as discussed above. The peak amplitudes of the thermal signals of the MR elements 80*a* and 80*b* of the selected MR head 80 are determined and adjusted by calibration gains $k_1$ and $k_2$ respectively such that the two amplitudes are equal. The peak amplitudes correspond to sector marker 106 crossings and may be obtained from the statistical average of many sector marker 106 crossings. Calibration gains $k_1$ and $k_2$ for the selected MR head 80 are then stored in a random access memory (RAM) and used by the demodulation and adaptive calibration 248 as discussed hereinabove. The calibration process is repeated for another MR head 80 until all MR heads 80 in the storage device have been calibrated.

It is noted that using pre-embossed disks requires that the servo information be formed on the disk prior to assembly into the disk drive. When multiple disks are used, the alignment of servo information from disk to disk must be taken into account. For example, due to mechanical tolerances in multiple disk drives, it is unlikely that the index markers 112 of the disks 24 will be aligned throughout the disk pack. Thus, the relative position of the index markers 112 in a disk pack must be determined. A timing calibration method for determining the position of all of the index markers 112 of the disks 24 in a disk pack may be performed. The timing calibration procedure includes identifying the index marker 112 of a first, reference disk 24 and measuring the time difference (including head switch time) between the reference disk 24 index marker 112 and an index marker 112 of a second disk 24. This is repeated until the relative position of all index markers 112, and therefor sectors 52, is established. Advantageously, the relative timing calibration can be performed simultaneously with the thermal signal calibration.

Since thermally obtained servo information is independent of the magnetic signal, in accordance with another embodiment of the invention the thermal component of a readback signal of an MR head 80 can be used to servo position the MR head 80 while the head is writing. Servo positioning while performing a write operation can be accomplished by compensating for the temperature and corresponding resistance change of the MR elements 80*a* and 80*b* which is created by the writing field generated by the write element. The amount of compensation may be determined using known information about the data being written. After compensation, the thermal signals can be extracted and used for servo positioning as previously described. The continuous nature of the servo position sensing, i.e., sensing during reading and writing, eliminates the need to use accelerometers or other external sensors to monitor shock and vibration in a drive.

Figure 8:
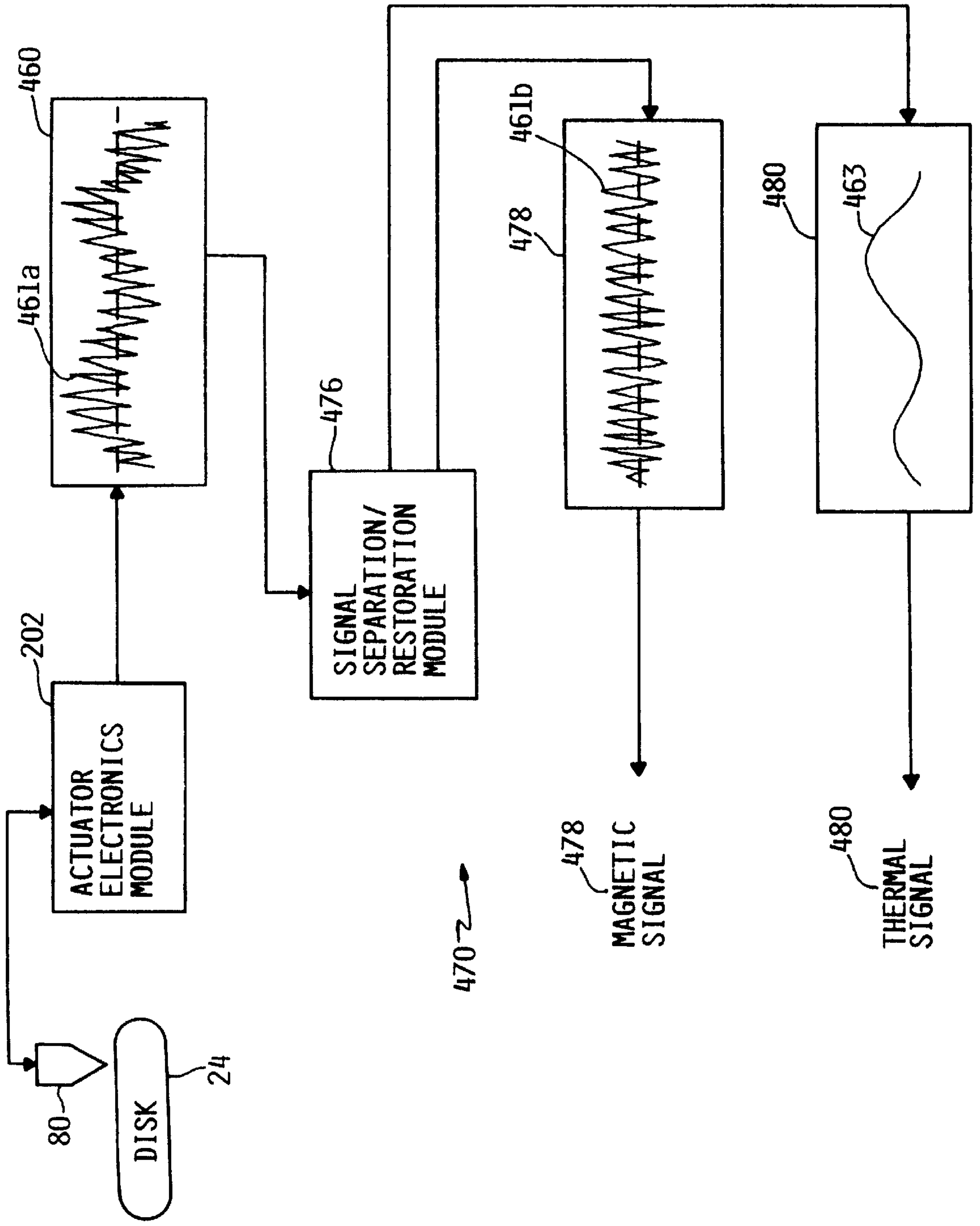
FIG. 8 is a block diagram of an apparatus for extracting a thermal signal and a magnetic signal from a readback signal induced in an MR head.

For purposes of providing an understanding of an apparatus and method for extracting a thermal signal component and a magnetic signal component from a readback signal induced in an MR head 80, reference is made to FIGS. 8–24. Referring to FIG. 8, there is illustrated an apparatus for reading an information signal, having a magnetic signal component and a thermal signal component, from a magnetic storage medium and for separating the thermal and magnetic signal components from the information signal. An MR head 80 is shown in close proximity with a surface of a data storage disk 24. The readback signal induced in the MR head 80 is typically amplified by the AE module 202. Filtering of the readback signal by the AE module 202 may also be performed. As shown in graphical form at the output of the AE module 202, the analog readback signal 460, containing a relatively high frequency magnetic signal component 461*a,* exhibits a distorted D.C. baseline due to the presence of a low frequency modulating signal component. It is appreciated by those skilled in the art that a modulated readback signal 460, or more particularly, a modulated magnetic signal component 461*a* of the readback signal 460 has long been identified as a source of a number of data storage system maladies, including servo control errors and inaccuracies, a reduction in data storing and retrieving reliability, and, in some cases, an irretrievable loss of data.

It has been discovered by the inventors that the readback signal 460 is a composite signal comprising independent magnetic and thermal signal components, and that the low frequency modulating readback signal baseline is in actuality an independent thermal signal component of the readback signal 460. It has further been determined by the inventors, as will also be discussed in detail hereinbelow, that the undesirable readback signal 460 modulation can be eliminated or substantially reduced in magnitude, thus providing for a pure magnetic signal representative of data or servo information.

Figure 9:
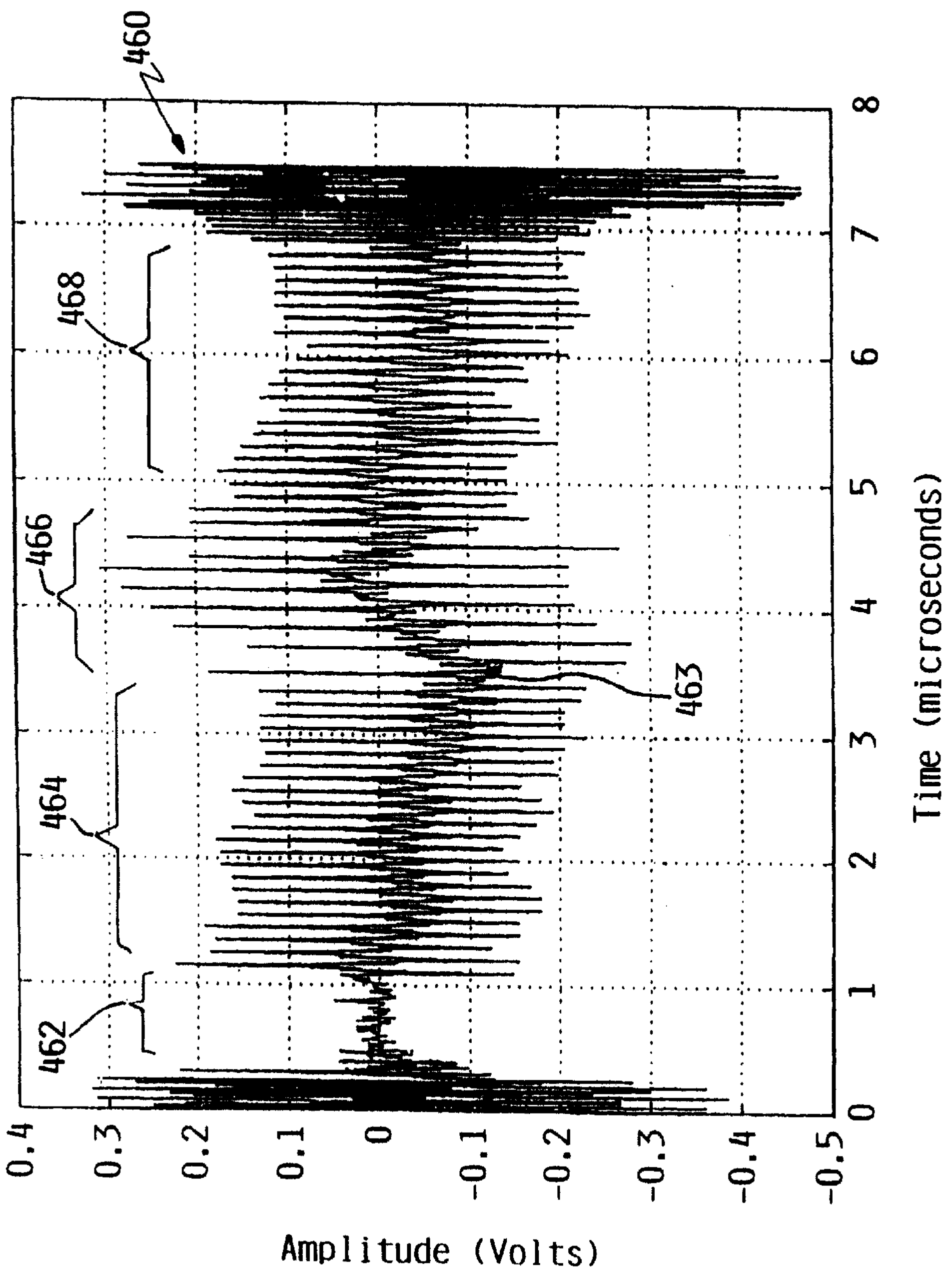
FIG. 9 is a showing of a readback signal induced in an MR head exhibiting a distorted D.C. baseline.
Figure 10:
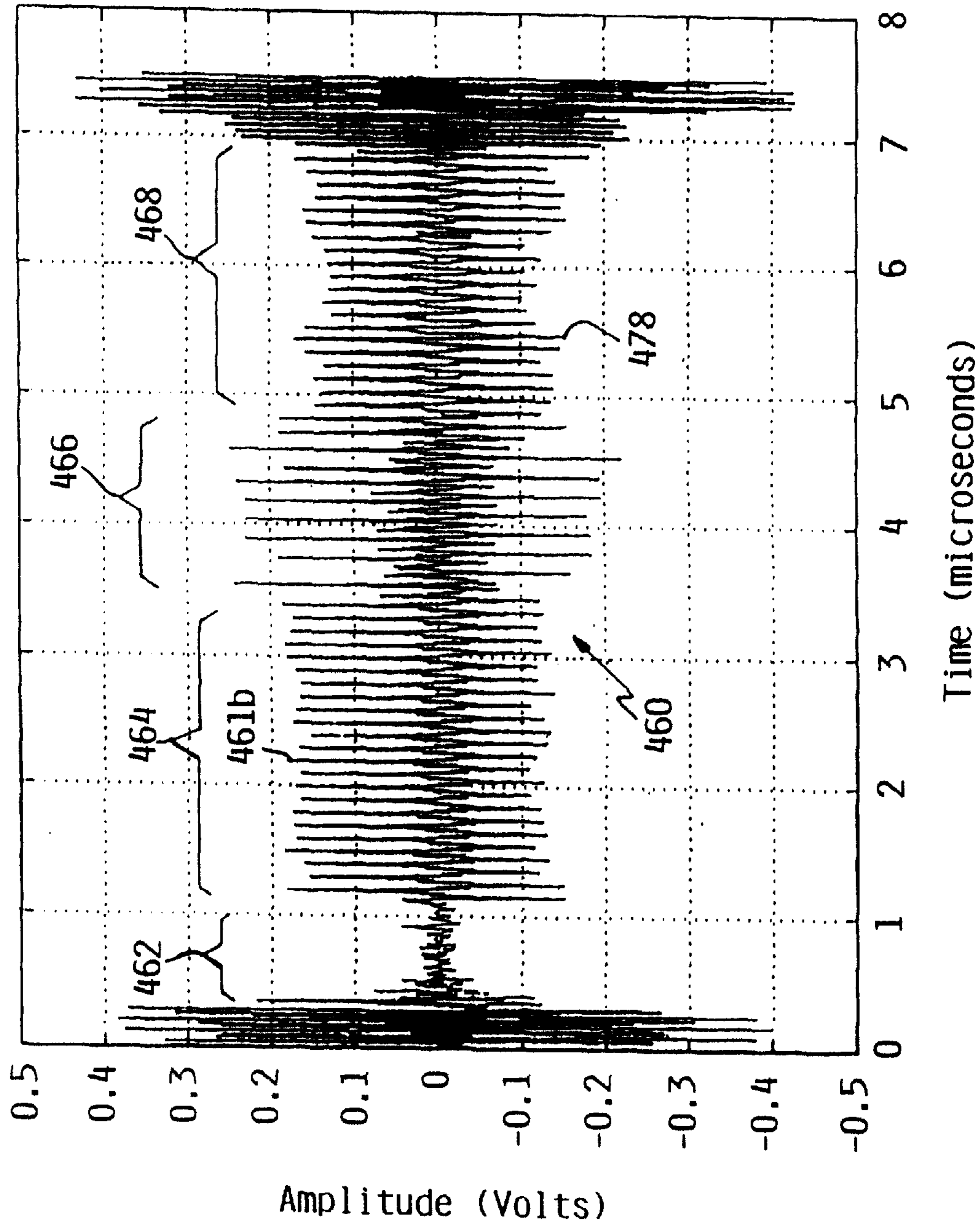
FIG. 10 is a showing of the readback signal of FIG. 9 exhibiting a restored D.C. baseline after being processed by a signal separation/modulation module.

In FIGS. 9 and 10, there is respectively illustrated a distorted readback signal and an undistorted readback signal restored by a signal separation/restoration module 476 as shown in FIG. 8. The signal separation/restoration module 476 processes the readback signal 460 to restore the readback signal baseline, as shown in FIG. 10, by eliminating the undesirable baseline modulation, thereby producing a pure, unperturbed magnetic signal 461*b*. It is noted that the signal separation/restoration module 476 generally represents the readback signal filter apparatus of the servo control system 200 illustrated in FIG. 7 needed to extract the thermal signal from the readback signal.

Figure 12A:
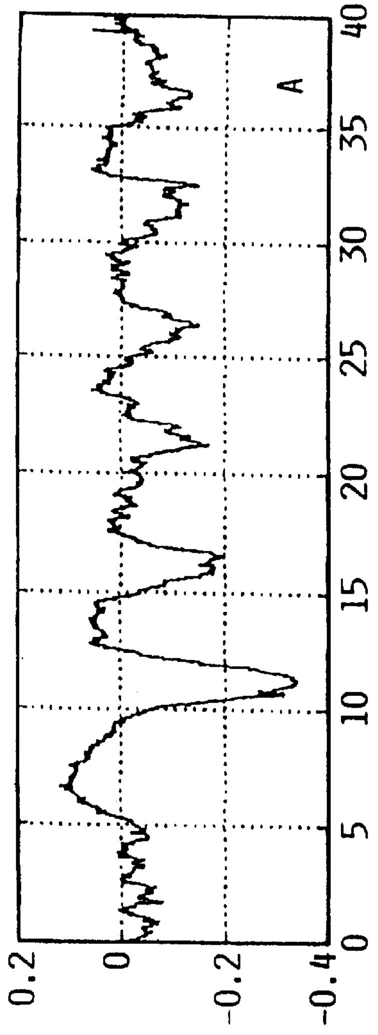
FIG. 12(*a*) is a showing of a thermal signal extracted from a readback signal induced in an MR head at a particular track location, and FIG. 12(*b*) a readback signal obtained from the same track location after AC erasure.
Figure 12B:
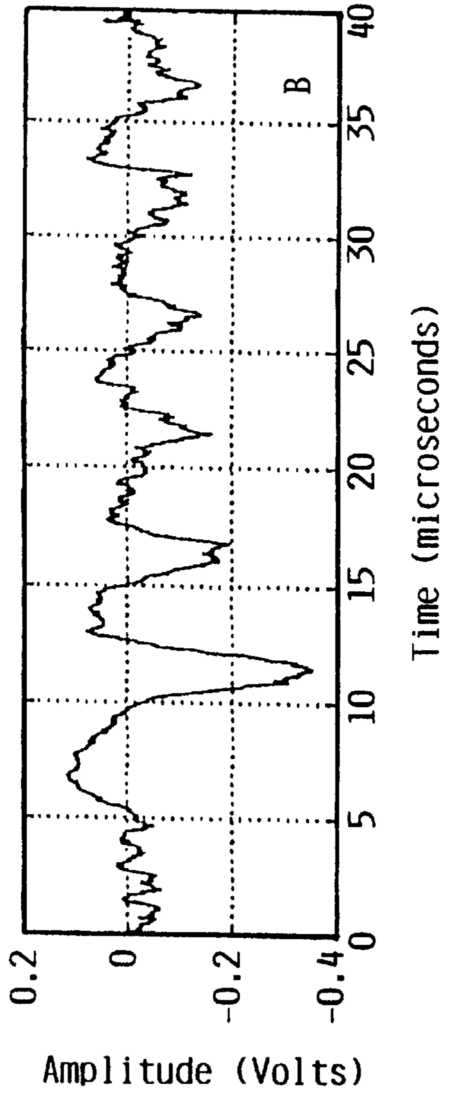

The independence of the magnetic signal and the thermal signal is demonstrated by the waveforms shown in FIG. 12. The waveform shown in FIG. 12(*a*) represents the thermal signal extracted from a composite readback signal using an MR head and a digital filter configured as a low pass filter. After the waveform shown in FIG. 12(*a*) was obtained, the track from which the waveform was generated was subject to AC erasure. The same MR head was moved to the same track location of the erased track to obtain the waveform shown in FIG. 12(*b*). It can be seen that the extracted thermal signal shown in FIG. 12(*a*) and the readback signal derived from the erased track shown in FIG. 12(*b*) are substantially identical. The two waveforms provided in FIG. 12 verify that the two simultaneously read thermal and magnetic signals are independent and separable.

Figure 11:
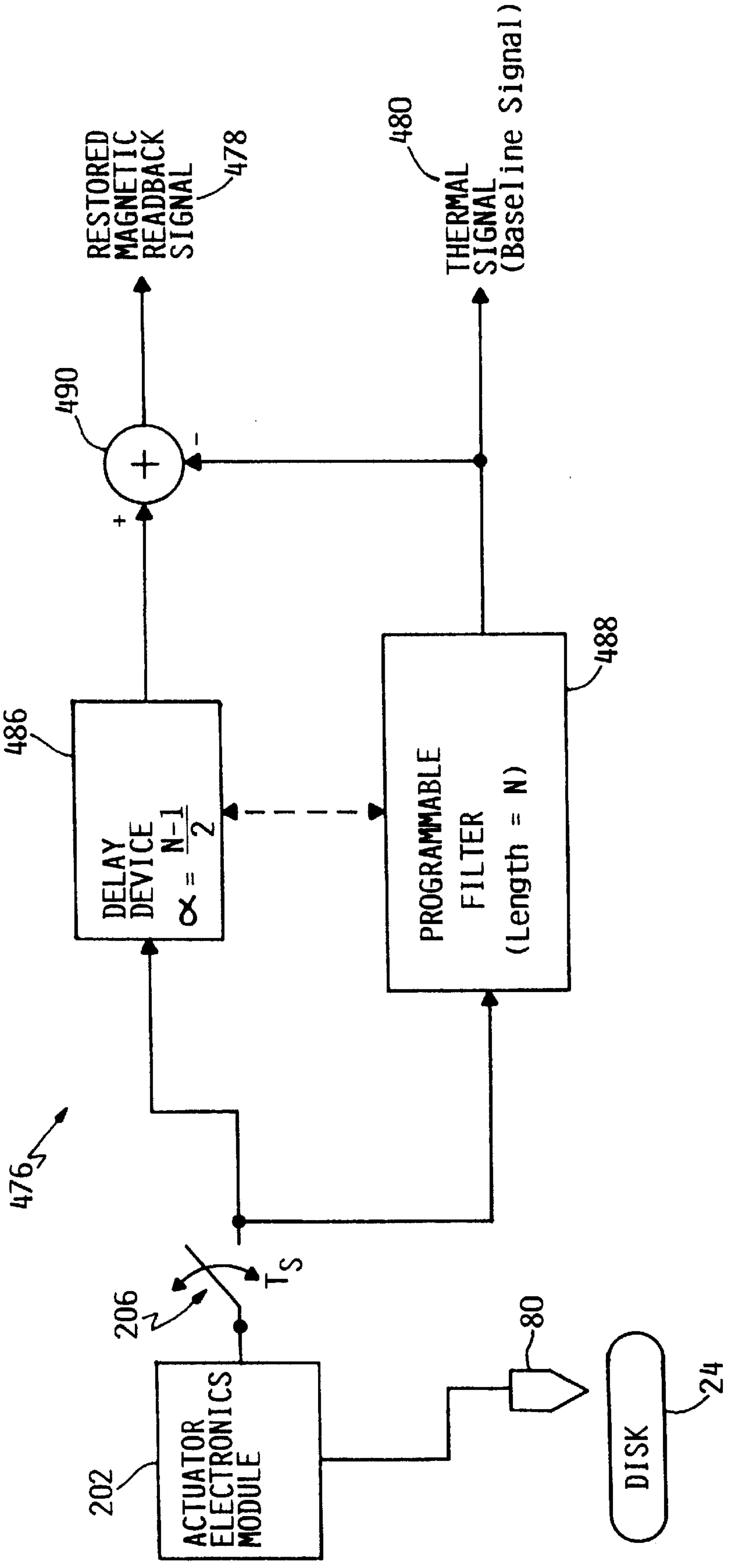
FIG. 11 is a block diagram of a signal separation/modulation module for extracting a thermal signal and a magnetic signal from a readback signal induced in an MR head.

Referring to FIG. 11, there is illustrated an embodiment of a signal separation/restoration module 476 discussed previously with respect to FIG. 8. It is to be understood that the signal separation/restoration module 476 may be employed to perform the single task of separating the independent magnetic signal from the readback signal 460 in order to remove the low frequency modulation component of the readback signal 460 attributed to thermal signal influences. In another embodiment, the signal separation/restoration module 476 may be employed to perform the dual tasks of separating the magnetic signal component from the readback signal 460 to remove low frequency thermal signal component, and, in addition, extracting the thermal signal, thus making available for subsequent processing both the pure magnetic signal and pure thermal signal in independent form.

As shown in FIG. 11, a readback signal is sensed by the MR head 80 situated in close proximity with a magnetic data storage disk 24. In one embodiment, a readback signal received from the AE module 202 from the MR head 80 is converted from analog form to digital form by an analog-to-digital converter 206. The digitized readback signal is then communicated to a delay device 486 and to a programmable filter 488. The programmable filter 488 is a finite impulse response (FIR) filter having a length N, where N represents the number of impulse response coefficients or taps of the programmable filter 488. The readback signal applied to the input of the programmable filter 488 is subject to a total signal delay corresponding to the length N of the programmable filter 488 as the readback signal passes through the programmable filter 488.

In accordance with this embodiment, the programmable filter 488 is programmed with appropriate tap coefficients and weights so as to pass the relatively low frequency thermal signal component of the readback signal and to filter out the relatively high frequency magnetic signal component. As such, the programmable filter 488 is configured as a low pass filter and programmed to pass the thermal signal which can be generally characterized as a medium frequency signal with much of its energy in the frequency range of approximately 10 kilohertz (KHz) to approximately 100–200 KHz. It is noted that the magnetic signal component of the readback signal has a frequency ranging between approximately 20 megahertz (MHz) and 100 MHz. The thermal signal 480 at the output of the programmable filter 488 is communicated to a signal summing device 490. From the output of the programmable filter 488, the thermal signal 480 may be transmitted to other components in the data storage system, such as a servo control for purposes of controlling track following and track seeking operations.

The delay device 486 receives the readback signal 460 from the analog-to-digital converter 206 and delays the transmission of the readback signal to the signal summing device 490 by a duration of time equivalent to the delay time required for the readback signal 460 to pass through the programmable filter 488. As such, the readback signal 460, containing both magnetic and thermal signal components, and the thermal signal 480, extracted from the readback signal by the programmable filter 488, arrive at the signal summing device 490 at substantially the same time. The signal summing device 490 performs a demodulation operation on the readback signal 460 and thermal signal 80 to produce a restored readback signal 478. Thus, the signal separation/restoration module 476 illustrated in the embodiment depicted in FIG. 11 provides for the separation of the magnetic and thermal signal components of a composite readback signal and, additionally, produces a non-distorted restored magnetic readback signal 478. For more details on designing, implementing, and programming a FIR filter for use in the signal separation/restoration module 476, reference is made to E. C. Ifeachor, B. W. Jervis, "Digital Signal Processing" (Addison-Wesley Publishing Company, Inc. 1993).

Returning to FIGS. 9 and 10, the modulated readback signal 460 shown in FIG. 9 represents the appearance of the readback signal prior to being processed by the signal separation/restoration module 476. The representation of the readback signal in FIG. 10 is a showing of the readback signal of FIG. 9 after being processed by the signal separation/restoration module 476. The undesirable influence of the thermal signal component of the distorted readback signal shown in FIG. 9 was eliminated by employing a 9-tap FIR filter in the signal separation/restoration module 476 in order to produce the restored magnetic readback signal 478 shown in FIG. 10. The magnitude and phase characteristics of the 9-tap FIR filter utilized to produce the restored magnetic readback signal 48 shown in FIG. 10 are illustrated in FIG. 14.

Figure 13A:
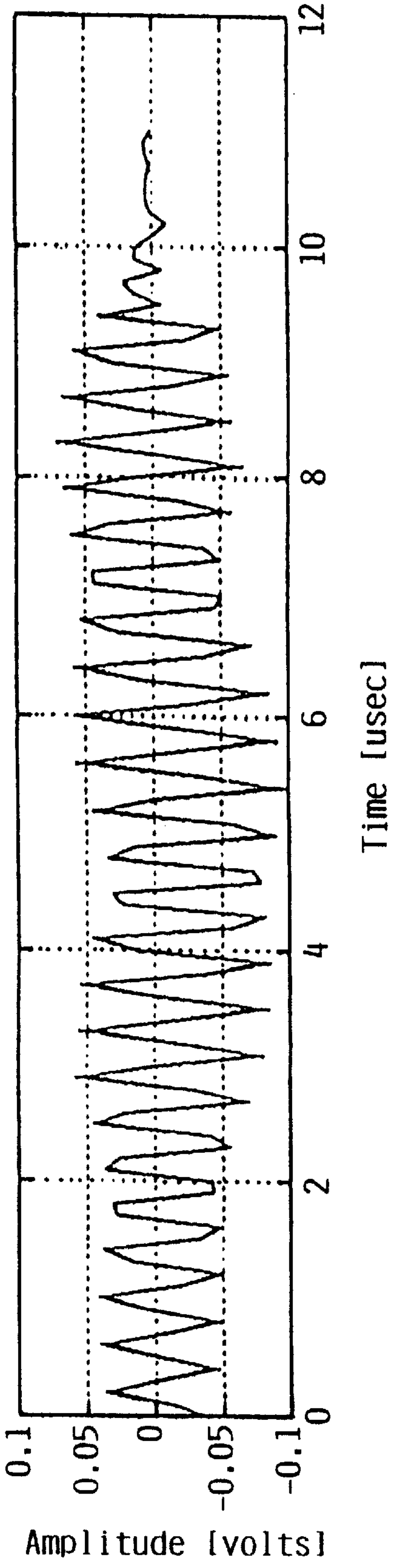
FIGS. 13(*a*)–13(*c*) respectively illustrate a readback signal induced in an MR head, a restored magnetic signal component of the readback signal, and an unrestored magnetic signal component of the readback signal.
Figure 13B:
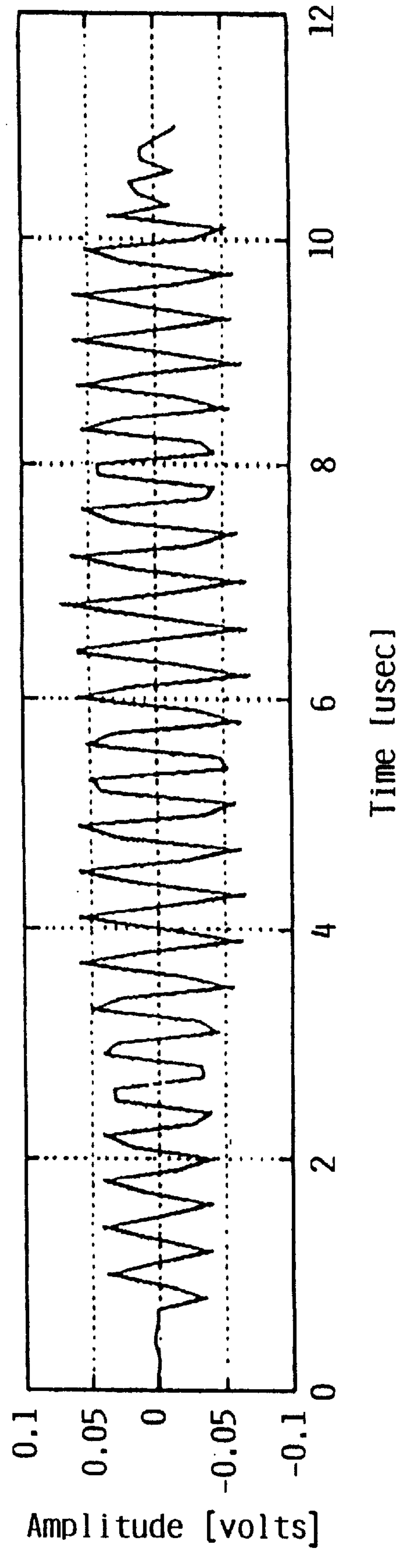
Figure 13C:
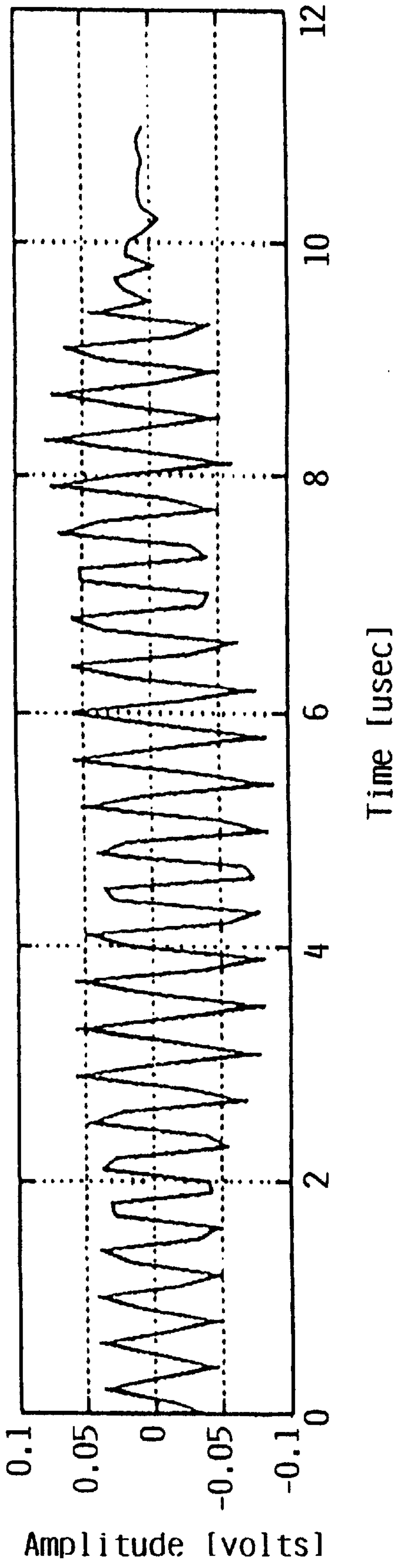
Figure 14A:
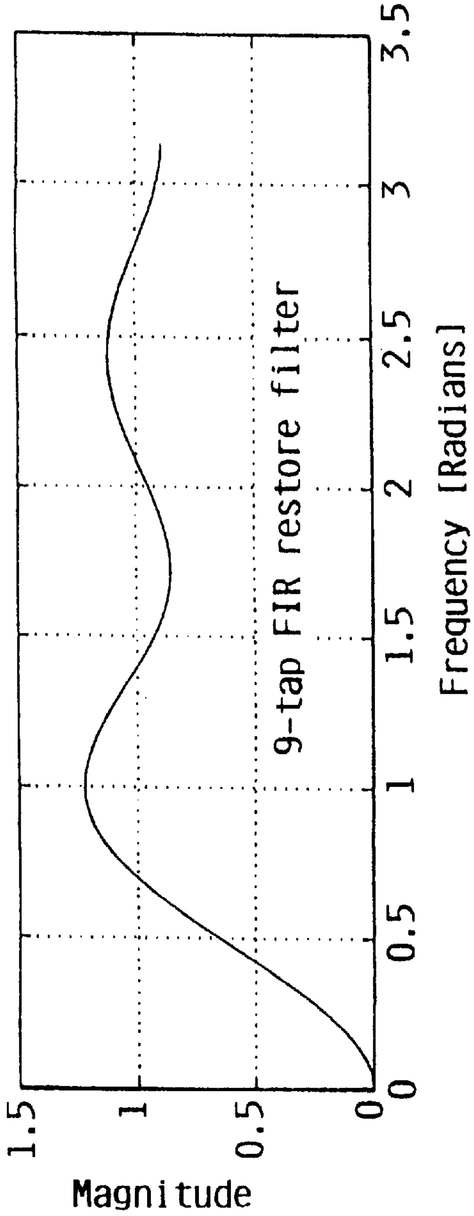
FIGS. 14 and 15 respectively illustrate the phase and magnitude response of a finite impulse response (FIR) filter and a windowed FIR filter used in a signal separation/restoration module.
Figure 14B:
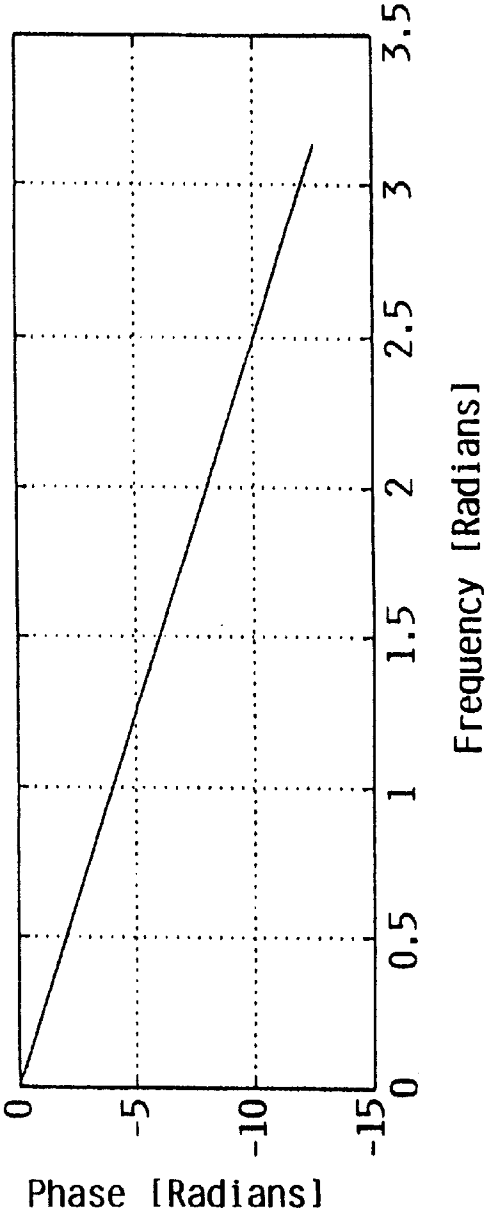

In particular, it can be seen in FIG. 14(*b*) that the 9-tap filter exhibits perfect linear phase response over the frequency range of interest. The effectiveness of the 9-tap FIR filter in eliminating the baseline shift or modulation of the readback signal is demonstrated in FIG. 13. FIG. 13(*a*) shows a readback signal demonstrating an unstable or time-varying baseline. In FIG. 13(*b*), the modulating baseline of the readback signal apparent in FIG. 13(*a*) has been eliminated after passing the distorted readback signal through an appropriately programmed 9-tap FIR filter. The tap weights for the 9-tap filter used to restore the baseline of the readback signal was defined to include tap weights of:

b(i)=(1/9)*(−1, −1, −1, −1, 8, −1, −1, −1, −1)

or b(i)=(−0.111, −0.111, −0.111, −0.111, 0.889, −0.111, −0.111, −0.111, −0.111)

The waveform shown in FIG. 13(*c*) was produced by passing the modulated readback signal shown in FIG. 13(*a*) through a conventional highpass Butterworth filter, which is a single-pole highpass filter. It can be seen that the undesirable modulating baseline of the readback signal is not significantly reduced in magnitude after passing the readback signal through a conventional highpass filter.

As previously indicated, the magnitude and phase characteristics of the 9-tap FIR filter used to restore the baseline of the readback signal as shown in FIG. 13(*b*) are respectively shown in FIGS. 14(*a*) and 14(*b*). It can be seen in FIG. 14(*a*) that some degree of ripple may occur in the passband of the filter which may be eliminated by applying a window function to the tap weights of the 9-tap FIR filter. By way of example, a Hamming window can be applied to the tap weights of the 9-tap FIR filter to produce a windowed restore filter having the following tap weights:

b(i)=(−0.0089, −0.0239, −0.06, −0.0961, 0.8889, −0.0961, −0.06, −0.0239, −0.0089,)

Figure 15A:
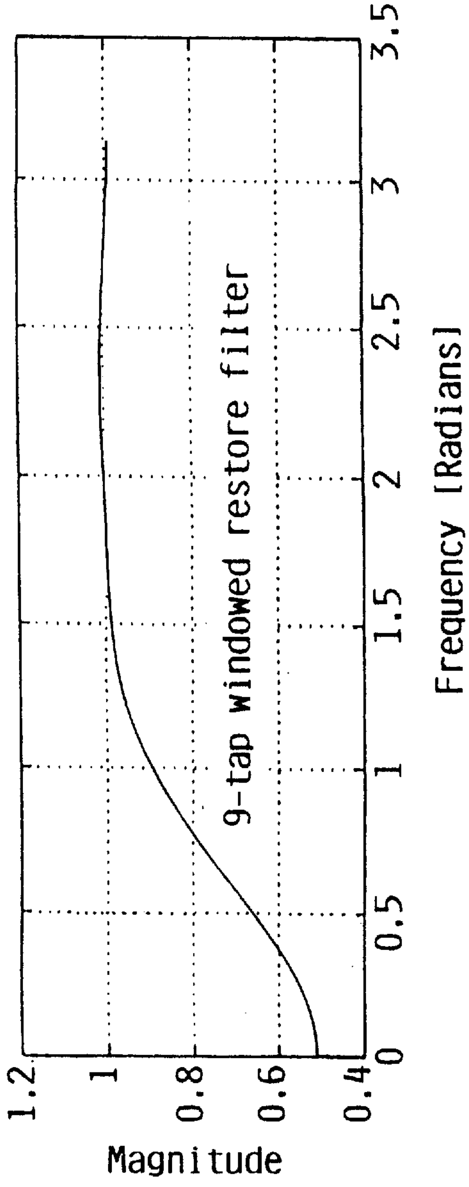
Figure 15B:
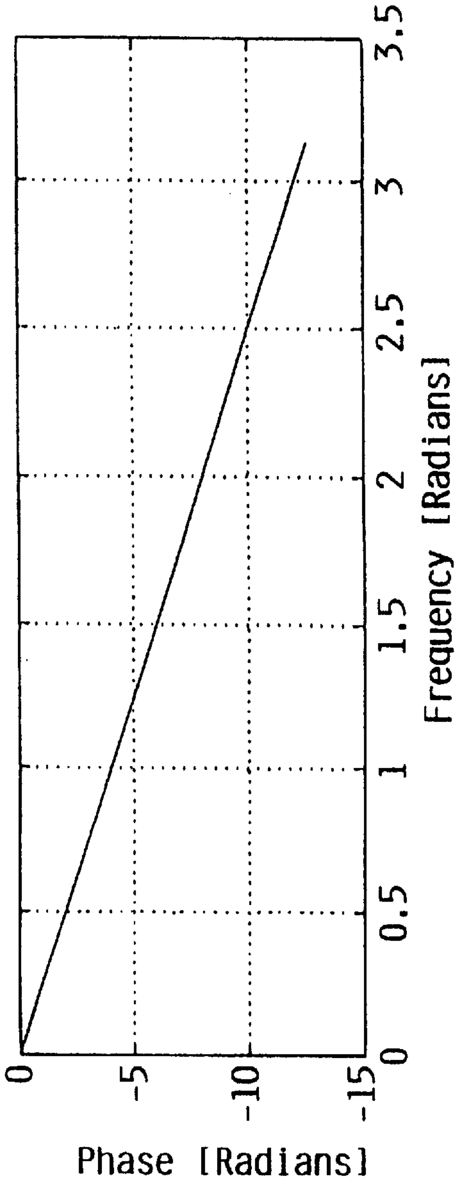

The output of the 9-tap windowed FIR filter having the above-listed tap weights results in the elimination of the ripple as shown in FIG. 15(*a*). As further shown in FIG. 15(*b*), the windowed 9-tap FIR filter retains its perfect linear phase response. It is noted that applying a window function, such as a Hamming window, to the tap weights of the programmable FIR filter 488 allows for a non-zero DC gain and some increase in low frequency response.

Turning now to FIGS. 19–24, there is illustrated another embodiment of a signal separation/restoration module 476. In the design of an AE module 202 as illustrated in FIG. 8, it is often desirable to include a highpass filter in conjunction with a preamplifier for purposes of rejecting the relatively low frequency signal content of the composite readback signal produced by the MR head 80. The highpass filter of the AE module 202 distorts both in amplitude and phase the thermal signal component of the composite readback signal. The magnitude of the thermal signal distortion due to the highpass filter varies in severity depending on the frequency and phase response of the particular highpass filter employed.

By way of example, a highpass filter suitable for use in an AE module 202 may have a cutoff frequency of approximately 500 KHz and exhibit non-linear phase behavior. The frequencies associated with head-to-disk spacing changes, however, typically range below 200 KHz. Moreover, the thermal signal of a readback signal typically has a frequency ranging between 10 KHz to approximately 100 KHz. It can be appreciated that a highpass filter having a cutoff frequency of approximately 500 KHz will significantly distort the amplitude and phase of the thermal signal component of the readback signal. The magnetic signal component of the readback signal, however, remains unaffected by the highpass filter since the frequency range for the magnetic signal is generally some 20 to 40 times that of the highpass filter cutoff frequency.

Figure 19:
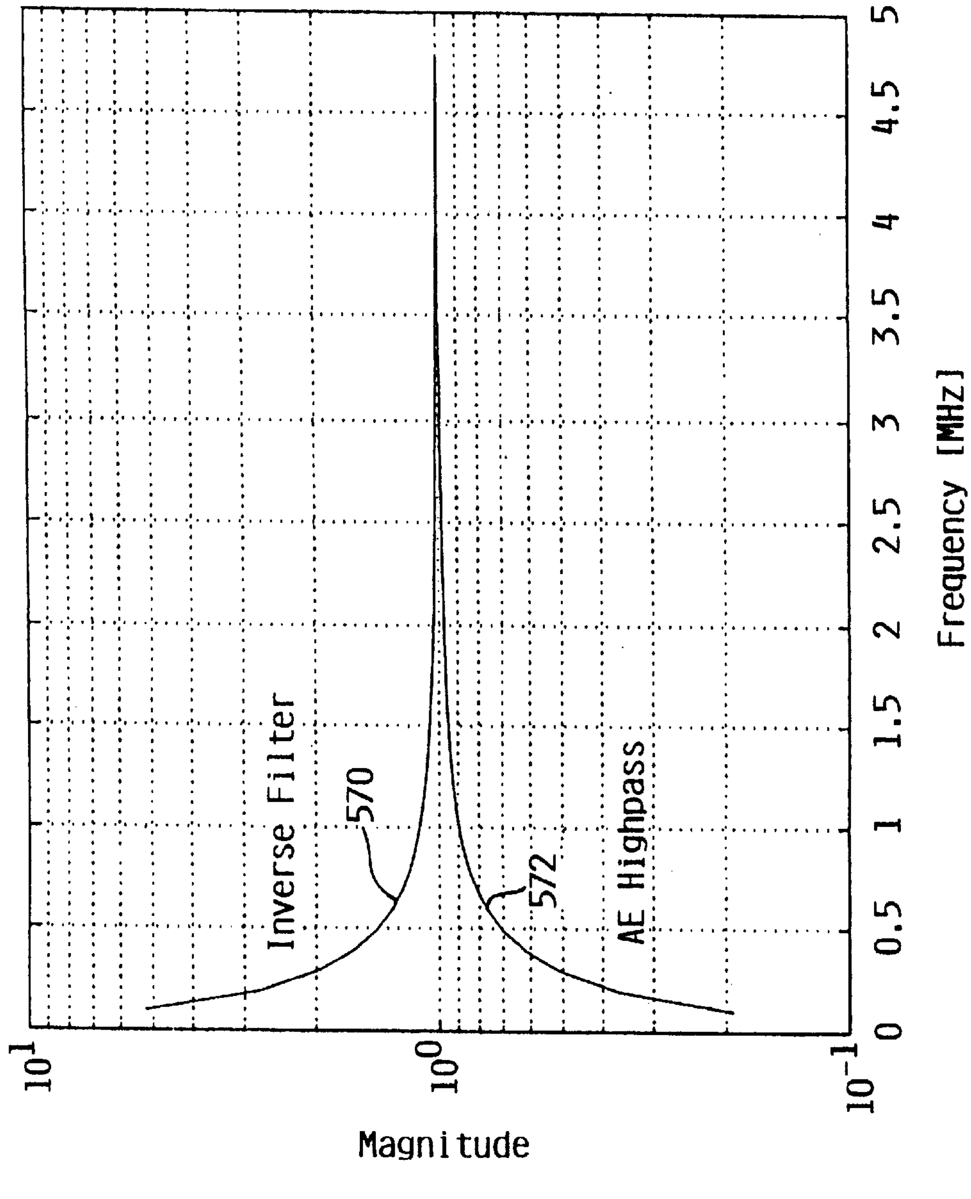
FIGS. 19 and 20 respectively show a comparison of the magnitude and phase response of the highpass filtering behavior of a typical AE module and that of an inverse filter having a transfer function inverse to that of the effective highpass filter of the AE module.
Figure 20:
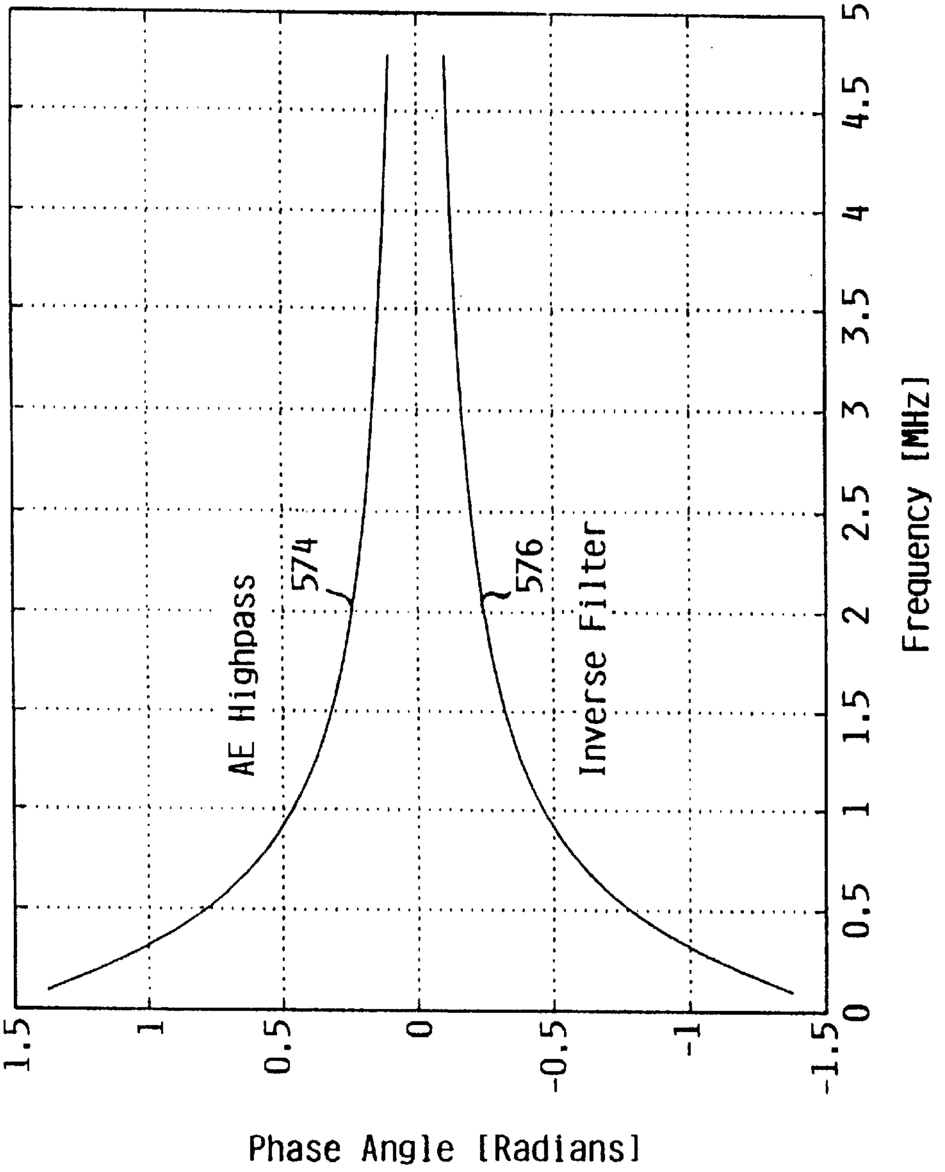

In FIGS. 19(*a*) and 19(*b*), there is respectively illustrated graphs showing the magnitude and phase response of the highpass filtering behavior of a typical AE module 202. The highpass filter has a cutoff frequency of approximately 500 KHz. The transfer function for the highpass filter having a single pole at 500 KHz and the magnitude and phase response illustrated in FIG. 19 can be defined as:

$$H_o = \frac{b_h(1) + b_h(2)\cdot z^{-1}}{1 + a_h(2)\cdot z^{-1}} \quad [4]$$

where:

| |
|---|
| $b_h(1) = .9876$ |
| $b_h(2) = -.9876$ |
| $a_h(2) = -.9752$ |

The distortion to the amplitude and phase of a thermal signal introduced by the highpass filter of the AE module 202 is effectively eliminated by use of an inverse filter having a transfer function inverse to that of the highpass filter. Passing the readback signal output from the AE module 202 through the inverse filter restores the thermal signal to its original form, both in amplitude and phase. For example, the transfer function of an inverse filter for conditioning a readback signal passed through a highpass filter having the above-described transfer function of equation [4] is:

$$H_o^{-1} = \frac{1 + a_h(2)\cdot z^{-1}}{b_h(1) + b_h(2)\cdot z^{-1}} \quad [5]$$

The magnitude and phase response for the highpass filter of the AE module 202 and the inverse filter described above are respectively plotted in FIGS. 20 and 21. In particular, the magnitude response of the inverse filter and the highpass filter of the AE module 202 is respectively shown as curves 570 and 572 in FIG. 20. The phase response of the inverse filter and highpass filter is respectively shown as curves 576 and 574.

In one embodiment, an infinite impulse response (IIR) filter is programmed to respond as an inverse filter for purposes of restoring the thermal signal content of a highpass filtered readback signal. Although an analog filter can be employed in an alternative embodiment, an IIR filter provides a number of advantages well-suited for use as an inverse filter for purposes of restoring the amplitude and phase of a thermal signal distorted by the highpass filter behavior of the AE module 202.

Figure 21:
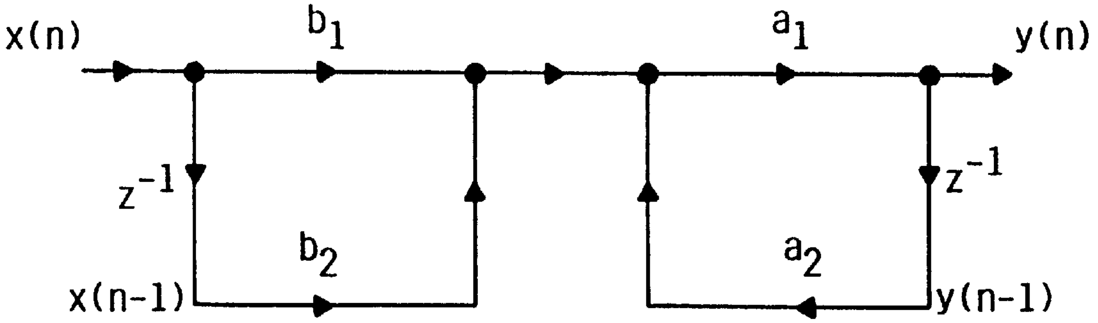
FIG. 21 is a signal flow diagram representative of the inverse filter of FIGS. 19 and 20.

The signal flow diagram illustrated in FIG. 21 is representative of a first order IIR filter configured as an inverse filter. The coefficients associated with the signal flow graph of FIG. 21 for a first order IIR inverse filter having a transfer function given by equation [5] above are:

$a_1$=0.9876

$a_2$=−0.9876

$b_1$=0.1

$b_2$=−0.9752

Figure 23A:
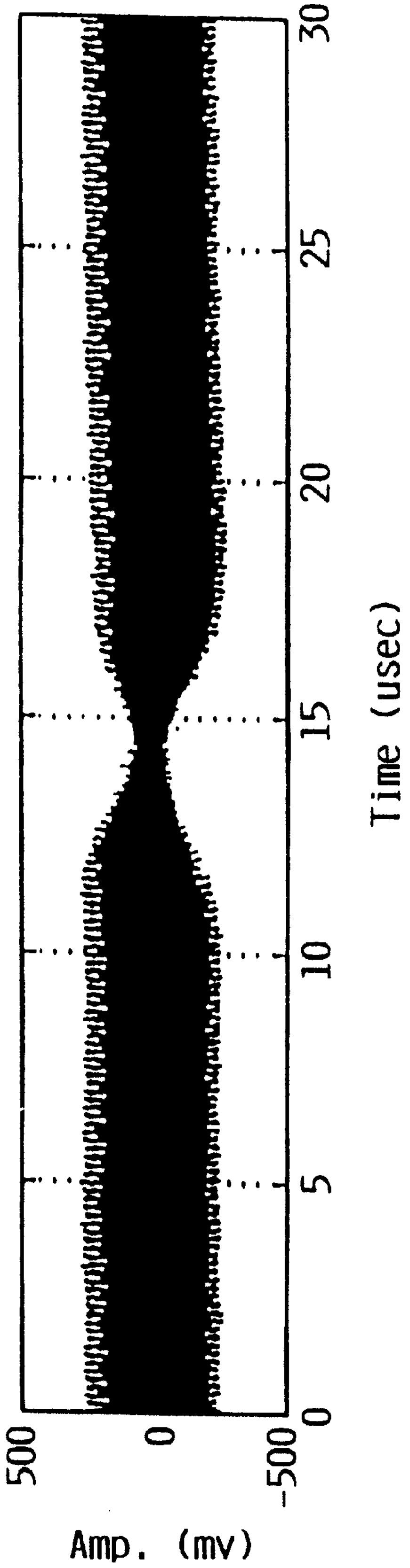
FIGS. 23(*a*)–23(*c*) show three waveforms produced at different processing points within the signal separation/restoration module of FIG. 22.
Figure 23B:
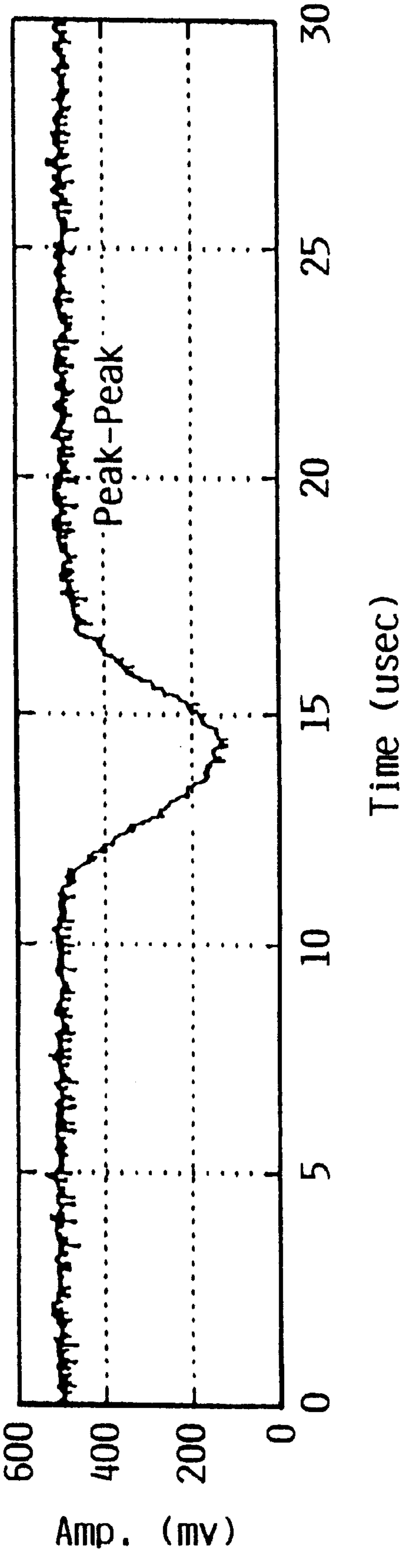
Figure 23C:
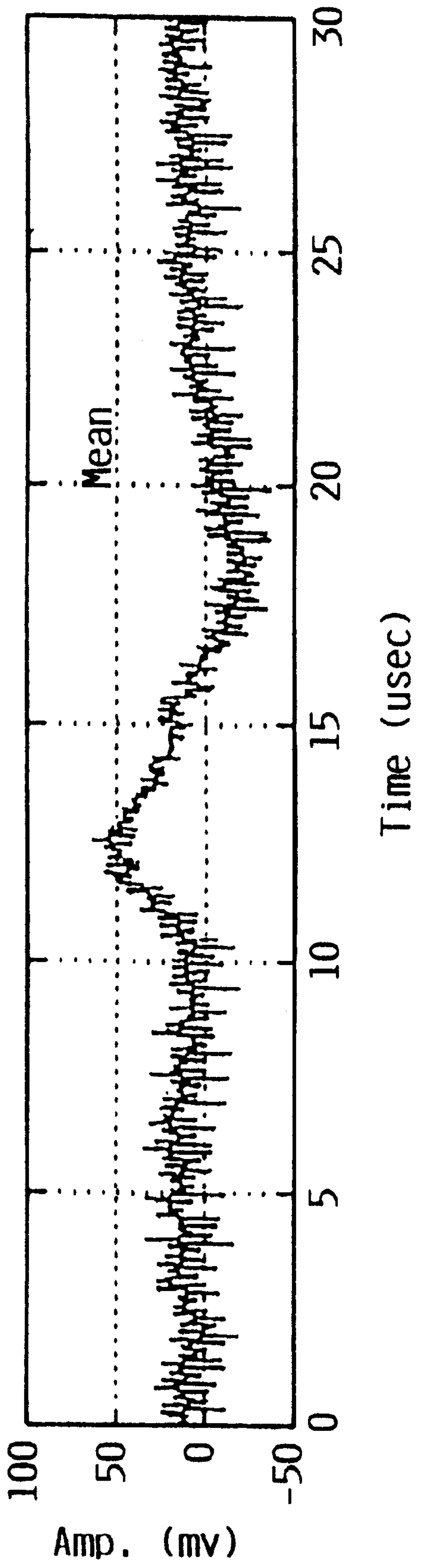

In FIG. 23, there is illustrated three waveforms that demonstrate the effectiveness of the inverse filter for restoring the original amplitude and phase of the thermal signal component of a readback signal that has been passed through a highpass filter. In FIG. 23(*a*), there is shown a readback signal detected from a pit in a data storage disk surface. The readback signal shown in FIG. 23(*a*) was detected from a track written at a 20 MHz write frequency. The readback signal was sampled at 100 MHz with 8-bit resolution. The graph shown in FIG. 23(*b*) represents the calculated peak-to-peak magnitude of the readback signal of FIG. 23(*a*). The signal shown in FIG. 23(*b*), accordingly, represents the magnetic spacing signal 160 which clearly shows a loss of magnetic signal due to the MR read element passing over the pit. FIG. 23(*c*) illustrates the thermal signal component of the readback signal after having been passed through the highpass filter 550 of the AE module 202. It can be seen by comparing the waveforms of FIGS. 23(*b*) and 23(*c*) that the magnetic spacing information and thermal spacing information do not correspond closely with one another because of the distortion to the thermal signal component caused by the highpass filter 550, which has essentially differentiated the thermal signal. For more details on designing, implementing, and programming an IIR filter for use as an inverse filter, reference is made to E. C. Ifeachor, B. W. Jervis, "Digital Signal Processing" (Addison-Wesley Publishing Company, Inc. 1993).

Figure 24:
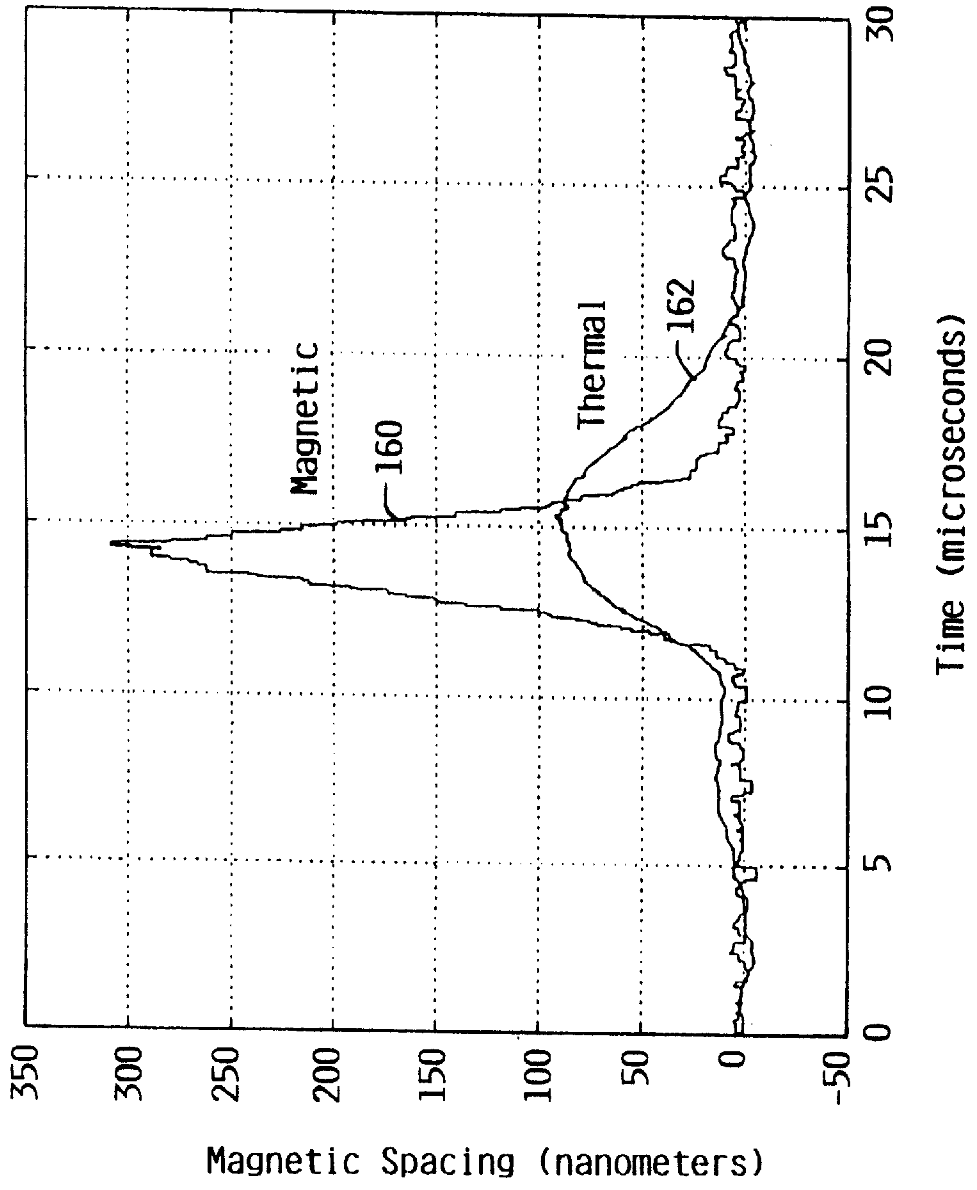
FIG. 24 is a comparative showing of a restored magnetic signal and thermal signal indicating the presence of a bump on a disk surface.

In FIG. 24, the thermal spacing signal 562 processed by the inverse filter 556 and mean filter 558 is illustrated together with the magnetic spacing signal 560 passed through the digital filter 552 and log device 554. It is noted that the linearized magnetic spacing signal 560 is typically calculated by taking the logarithm of the peak-to-peak signal and then multiplied by the known sensitivity of the output voltage change to magnetic spacing change in accordance with the well-known Wallace equation. It can be seen in FIG. 24 that except for a difference in signal height and a slightly longer time constant associated with the thermal spacing signal 562, a magnetic spacing signal 560 and thermal spacing signal 562 describe a disk surface pit. Thus, the integrating effect that the inverse filter 556 on the distorted thermal signal shown in FIG. 23(*c*) provides for a correct thermal spacing signal 562 to be produced.

Figure 22:
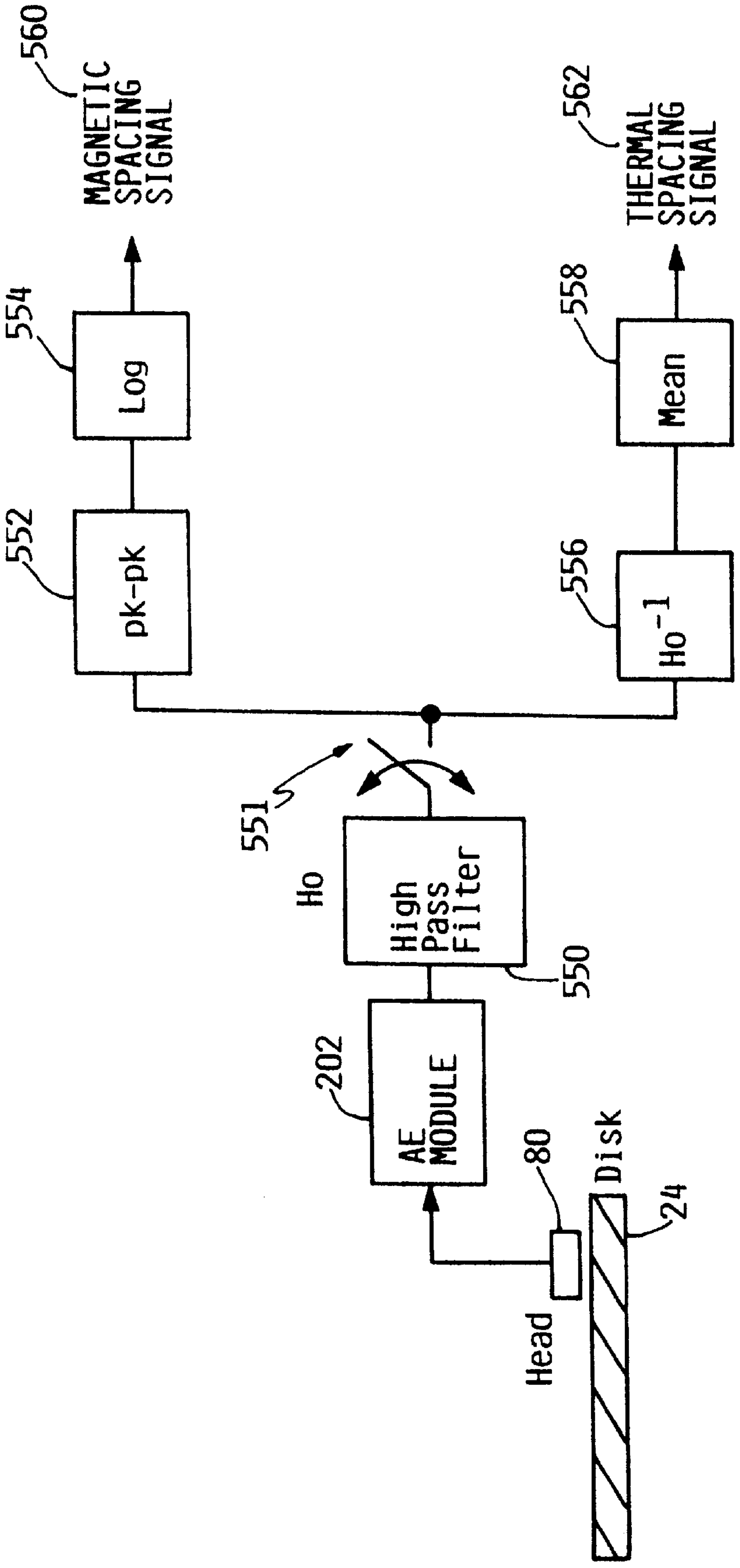
FIG. 22 is a block diagram of another embodiment of a signal separation/restoration module employing an infinite impulse response (IIR) filter.

Referring to FIG. 22, there is shown in block diagram form a system for processing a readback signal to obtain magnetic and thermal head-to-disk spacing information. A readback signal is detected from the disk surface 24 by the MR head 80. It is assumed that the readback signal is a composite signal containing both magnetic and thermal signal components. The readback signal detected by the MR head 80 is communicated to the AE module 202 and then to a highpass filter 550. The highpass filter 550 is shown as a component external to the AE module 202. In general practice, however, the highpass filter 550 is incorporated into the AE module 202. The transfer function of the highpass filter is denoted as $H_o$.

The output signal from the highpass filter 550 is sampled by an analog-to-digital converter 551 to create digitized samples of the highpass filtered readback signal. The digitized readback signal is then communicated to the inverse filter 556 which corrects for the distortion introduced by the highpass filter 550 of the AE module 202. The transfer function of the inverse filter 556 is denoted as $H_o^{-1}$. The mean of the signal passed through the inverse filter 556 is obtained by digital filtering using a mean filter 558 to produce a thermal signal which is linearly related to the head-to-disk spacing.

The readback signal provided at the output of the analog-to-digital converter 551 may also be communicated to a digital filter 552, such as a FIR filter, that extracts the peak-to-peak amplitude of the readback signal so as to extract the magnetic signal component from the readback signal. The logarithm of the magnetic signal is obtained by passing the magnetic signal through the log device 554, which produces a magnetic signal that is linearly related to the head-to-disk spacing. Having extracted both the magnetic and thermal spacing signals 560 and 562, respectively, the thermal signal can be calibrated since the magnetic calibration is known and only depends on the recorded wavelength of the signal. It is important to note that both the magnetic and thermal spacing signals 560 and 562 are linearly proportional to the head-to-disk spacing (y).

Figure 16:
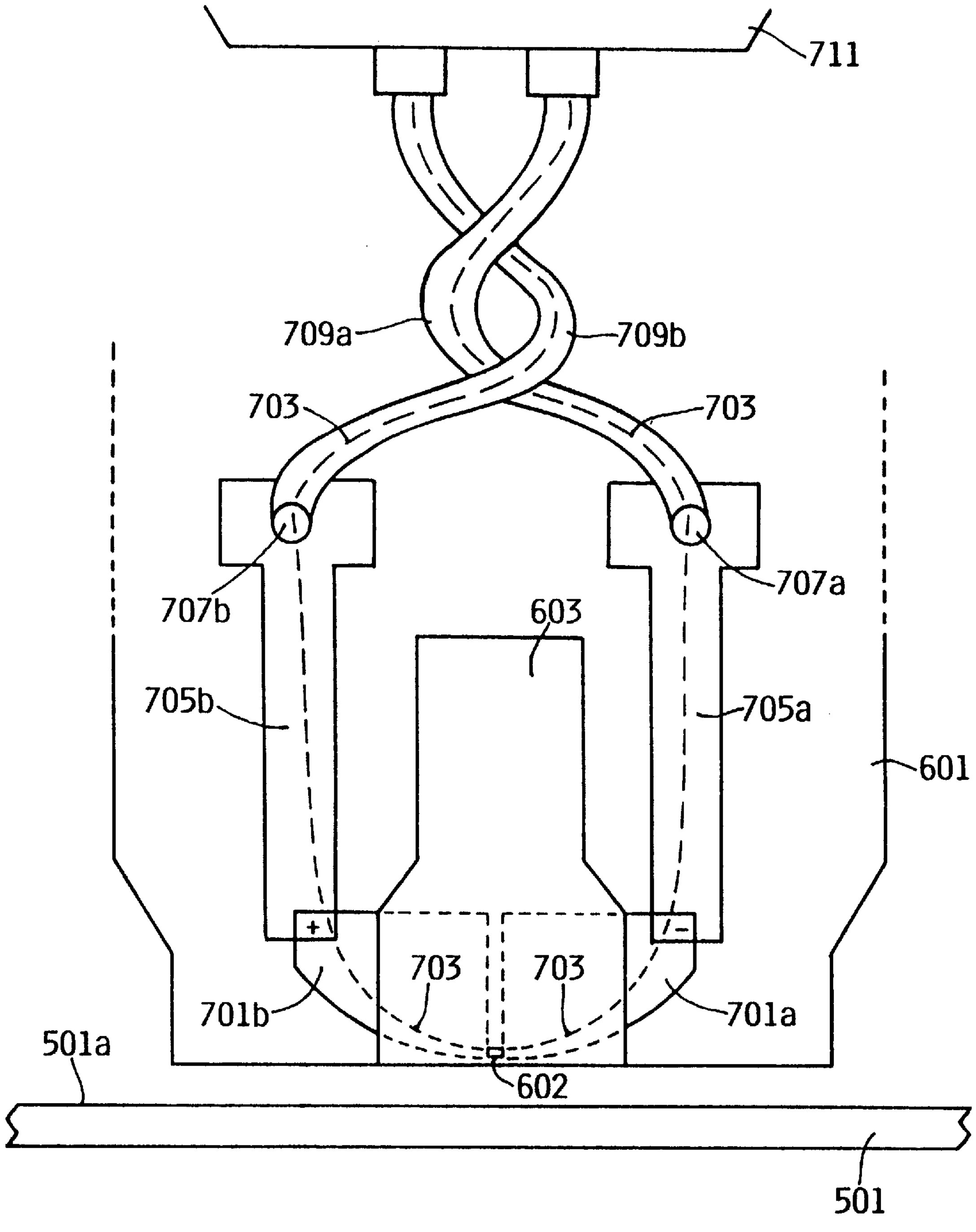
FIGS. 16 and 17 are illustrations of a conventional MR head.
Figure 17:
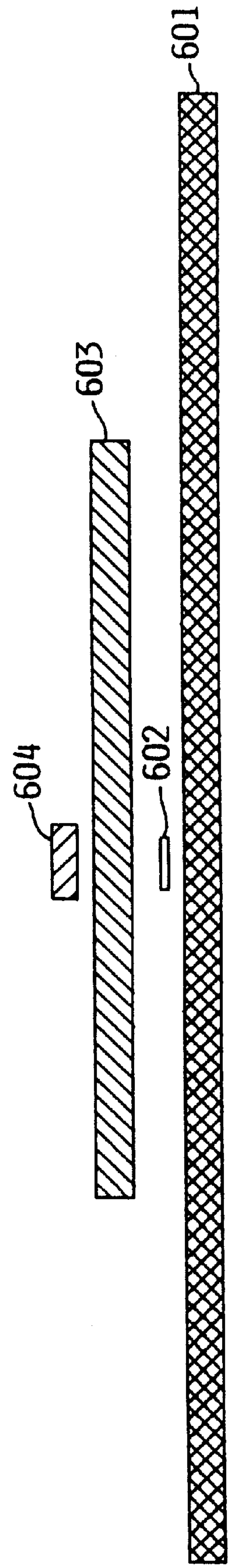
Figure 18A:
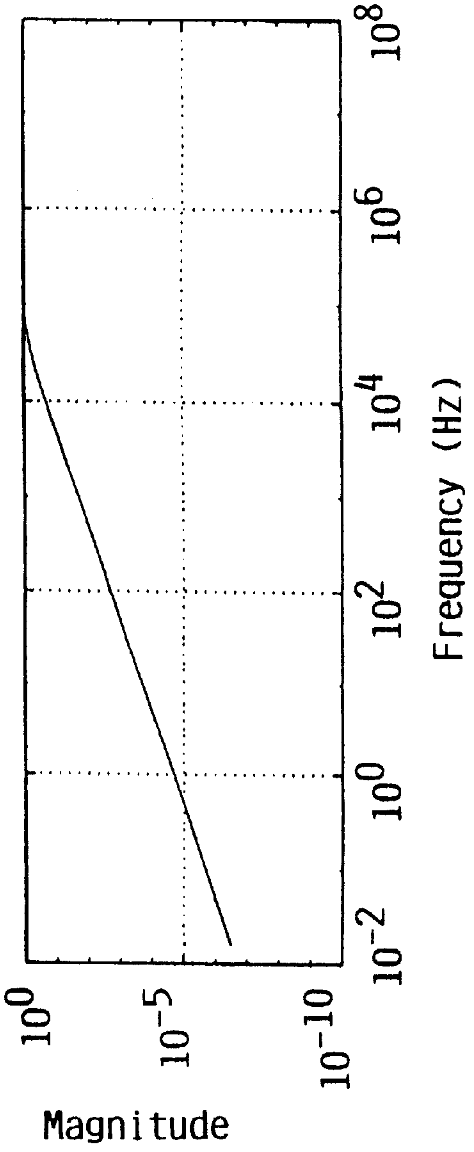
FIGS. 18(*a*) and 18(*b*) respectively illustrate the magnitude and phase response of the highpass filtering behavior of a typical Arm Electronics (AE) module.
Figure 18B:
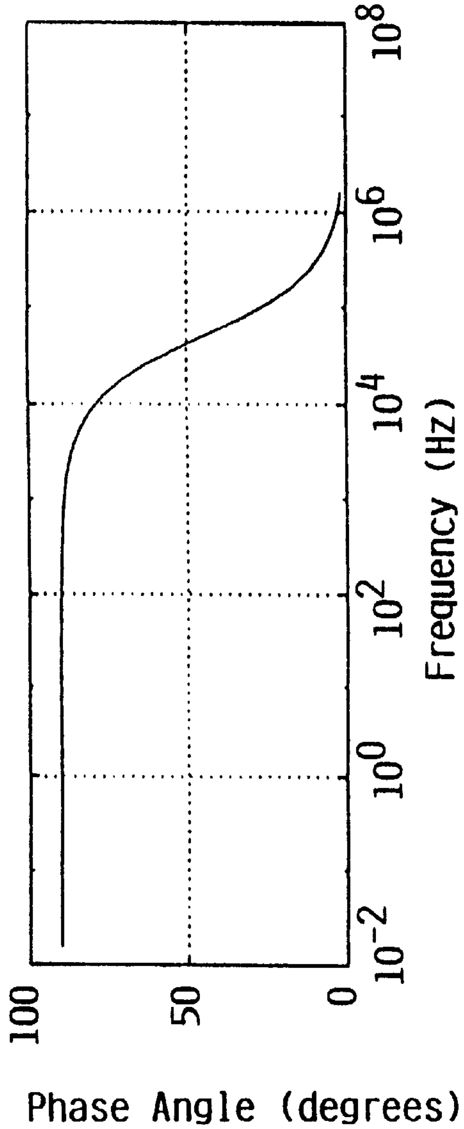

In order to more fully appreciate the various aspects of the present invention, a brief discussion of a conventional MR head is provided. The general layout of the principle elements in a typical merged MR head 600 is illustrated in FIGS. 16 and 17. The illustrations are not drawn to scale, but rather are provided to illustrate the relative orientation of the various MR head elements. The MR head includes a pair of shields 601 and 603. An MR element 602 is located between the shields 601 and 603. The MR element 602 operates as a read element of the MR head 600.

Element 603 in conjunction with element 604 form a thin film magnetic head functioning as a write element for the MR head 600. Elements 603 and 604 operate respectively as first and second magnetic poles of the thin film write element. The dual function of element 603 (i.e., acting as a first pole of the write element and as a second shield) results in the merged nature of the MR head 600. Insulation layers (not shown for purposes of clarity), such as glass, are typically formed between the various elements of the MR head 600.

As further depicted in FIGS. 16 and 17, the first shield 601, MR element 602, and second shield 603 extend upward from the surface 501A of a disk 501 in respective vertical planes. The second pole 604 is not shown in FIG. 16 for purposes of clarity. The planes of the elements are illustrated parallel running in the direction of the plane of the page. In the illustrations, the plane of the first pole/second shield 603 is closest, followed by the MR element 602, with the first shield 601 being furthest away. Also depicted, are the negative and positive MR leads 701A and 701B, respectively. These leads are formed in a plane between the first shield 301 and the first pole/second shield 603. The leads 701A and 701B are electrically coupled to the MR element 602 in a known manner and operate in the normal fashion. Connected to leads 701A and 701B, are extended leads 705A and 705B, respectively. The extended leads 705A and 705B have connection points 707A and 707B which are respectively connected to lead wires 709A and 709B which, in turn, are connected to a preamplifier module 711.

The physical phenomena that generates the thermal voltage response $v_{TH}$ across the MR head element 602 is that as the instantaneous head-to-disk spacing increases, there is more air space between the head 600 and the disk surface 501A causing the MR element 602 to heat up. This heating cause the MR head 600 resistance to increase due to the positive temperature coefficient of the material constituting the MR element 602. For example, permalloy has temperature coefficient of $+3\times10^{-3}/°$ C. as mentioned previously. At a constant bias current, the voltage $v_{TH}$ across the MR element 602 resistance will increase. If the MR element 602 comes in close proximity to the disk surface 501A, more heat transfer will occur between the MR element 602 and the disk surface 501A causing cooling of the MR element 602. The resulting lowering of the MR head 600 resistance will lower the voltage $v_{TH}$ across the MR element 602 at a constant bias current.

It will, of course, be understood that various modifications and additions can be made to the embodiments discussed hereinabove without departing from the scope or spirit of the present invention. For example, the servo positioning method and apparatus may be employed in systems employing optical data disks, or disks having spiralled or other non-concentric track configurations. Accordingly, the scope of the present invention should not be limited to the particular embodiments discussed above, but should be defined only by the full and fair scope of the claims set forth below.

What is claimed is:

1. A disk for use in a storage device having a magnetoresistive (MR) head with two MR elements and a servo control system for positioning said MR head in response to thermal signals induced in said MR elements, comprising:

a plurality tracks separated by track markers, said track markers being thermally detectable by said servo system.

2. A disk as recited in claim 1, wherein said track markers comprise topographical variations.

3. A disk as recited in claim 2, wherein said topographical variations comprise circumferential grooves.

4. A disk as recited in claim 1, wherein said track markers have a thermal emissivity which differs from the thermal emissivity of said tracks.

5. A disk recited in claim 1, further comprising sector markers intersecting said track markers, at least a portion of each of said sector markers being thermally detectable.

6. A disk as recited in claim 5, wherein said sector markers are radial grooves.

7. A disk as recited in 6, wherein said sector markers have a width in the calibration track of 50–100 microns.

8. A disk as recited in claim 1, further comprising a calibration track having a width wide enough such that when said MR elements are centered over said calibration track said MR elements do not detect said track markers.

9. A disk recited in claim 8, further comprising sector markers having a width in the calibration track wide enough for thermal detection.

* * * * *